US007538163B2

(12) United States Patent
Bezuidenhout et al.

(10) Patent No.: US 7,538,163 B2
(45) Date of Patent: May 26, 2009

(54) MODIFICATION OF THERMOPLASTIC POLYMERS

(75) Inventors: Deon Bezuidenhout, Cape Town (ZA); Jacobus P. Theron, Stellenbosch (ZA); Lawrence J. Higham, Durbanville (ZA); Peter P. Zilla, Cape Town (ZA)

(73) Assignee: Medtronic, Inc., Minneapolis, MN (US)

( * ) Notice: Subject to any disclaimer, the term of this patent is extended or adjusted under 35 U.S.C. 154(b) by 420 days.

(21) Appl. No.: 11/388,317

(22) Filed: Mar. 24, 2006

(65) Prior Publication Data

US 2006/0223955 A1 Oct. 5, 2006

Related U.S. Application Data

(60) Provisional application No. 60/664,767, filed on Mar. 24, 2005.

(51) Int. Cl.
C08F 283/04 (2006.01)

(52) U.S. Cl. ..................................................... 525/455

(58) Field of Classification Search .................. 525/455
See application file for complete search history.

(56) References Cited

U.S. PATENT DOCUMENTS

| | | | |
|---|---|---|---|
| 3,664,861 A | 5/1972 | Okamura et al. | |
| 3,823,051 A | 7/1974 | Chang | |
| 4,239,866 A | 12/1980 | Reitel et al. | |
| 4,255,552 A | 3/1981 | Schollenberger et al. | |
| 4,261,946 A | 4/1981 | Goyert et al. | |
| 4,366,301 A | 12/1982 | Le Roy et al. | |
| 4,642,242 A | 2/1987 | Solomon et al. | |
| 4,746,654 A | 5/1988 | Breliere et al. | |
| 4,762,884 A | 8/1988 | Goyert et al. | |
| 4,798,607 A | 1/1989 | Middleton et al. | |
| 4,820,745 A | 4/1989 | Muller et al. | |
| 5,017,664 A | 5/1991 | Grasel et al. | |
| 5,019,096 A | 5/1991 | Fox, Jr. et al. | |
| 5,159,056 A | 10/1992 | Earley | |
| 5,189,134 A | 2/1993 | Mignani et al. | |
| 5,237,000 A | 8/1993 | Lausberg et al. | |
| 5,286,493 A | 2/1994 | Oshlack et al. | |
| 5,324,775 A | 6/1994 | Rhee et al. | |
| 5,378,146 A | 1/1995 | Sterrett | |
| 5,580,578 A | 12/1996 | Oshlack et al. | |
| 5,589,563 A | 12/1996 | Ward et al. | |
| 5,855,618 A | 1/1999 | Patnaik et al. | |
| 5,929,129 A | 7/1999 | Feichtinger | |
| 5,997,969 A | 12/1999 | Gardon | |
| 6,001,958 A | 12/1999 | Tapolsky et al. | |
| 6,031,044 A | 2/2000 | Kokel et al. | |
| 6,040,415 A | 3/2000 | Arimori et al. | |
| 6,197,051 B1 | 3/2001 | Zhong | |
| 6,228,977 B1 | 5/2001 | Kanitz et al. | |
| 6,252,032 B1 | 6/2001 | Van Antwerp et al. | |
| 6,258,310 B1 | 7/2001 | Sardanopoli et al. | |
| 6,306,177 B1 | 10/2001 | Felt et al. | |
| 6,320,011 B1 | 11/2001 | Levy et al. | |
| 6,329,444 B1 | 12/2001 | McGlothlin et al. | |
| 6,348,408 B1 | 2/2002 | Kasai | |
| 6,348,518 B1 | 2/2002 | Montgomery | |
| 6,355,759 B1 | 3/2002 | Sherman et al. | |
| 6,420,452 B1 | 7/2002 | Gunatillake et al. | |
| 6,444,318 B1 | 9/2002 | Guire et al. | |
| 6,461,732 B1 | 10/2002 | Wittmann et al. | |
| 6,573,341 B2 | 6/2003 | Muhlfeld et al. | |
| 6,586,523 B1 | 7/2003 | Blum et al. | |
| 6,596,818 B1 | 7/2003 | Zamore | |
| 6,602,972 B1 | 8/2003 | Schwarte et al. | |
| 2002/0065373 A1 | 5/2002 | Krishnan | |
| 2002/0169255 A1 | 11/2002 | Lagneaux et al. | |
| 2002/0176837 A1 | 11/2002 | Khoshdel | |

FOREIGN PATENT DOCUMENTS

| | | | |
|---|---|---|---|
| CA | 02389389 | * | 4/2002 |
| DE | 19914882 | | 10/2000 |
| DE | 19953445 | | 5/2001 |
| FR | 2800744 | | 5/2001 |
| FR | 2817553 | A1 | 6/2002 |
| WO | WO 01/34674 | | 5/2001 |
| WO | WO 02/44239 | A1 | 6/2002 |
| WO | WO 2005/014683 | A1 | 2/2005 |

OTHER PUBLICATIONS

Coury et al., "Medical applications of implantable polyurethanes: current issues" *Progress in Rubber and Plastics Technology*, 1987;3:24-37.

Seifalian et al., "Noncompliance: The Silent Acceptance of a Villain" in *Tissue Engineering of Vascular Prosthetic Grafts*, R.G. Landes Co., Austin, TX, 1999; cover page, copyright page and table of contents; 13 pages.

Stokes et al., "Metal catalyzed oxidative degradation on implanted polyurethane devices" *Proceedings of the ACS Division of Polymeric Materials: Science and Engineering*, Fall Meeting 1985, Chicago, Illinois, vol. 53, pp. 6-10.

Alferiev et al., "Activated polyurethane modified with latent thiol groups" *Biomaterials*, 2002;23:4753-4758.

Boutevin et al., "Synthese de polyurethanes fluores" *Tetrahedron Lett.*, 1978;19(2):129-32.

Brandwood et al., "In vivo evaluation of polyurethanes based on novel macrodiols and MDI" *J. Biomater. Sci. Polym. Ed.*, 1994;6(1):41-54.

Camberlin et al., "Synthesis and DSC study of model hard segments from diphenyl methane diisocyanate and butane diol" *J. Polym. Sci.: Polym. Chem. Ed.*, 1982;20(2):383-392.

(Continued)

Primary Examiner—Randy Gulakowski
Assistant Examiner—Kyle Baumstein
(74) Attorney, Agent, or Firm—James H. Ackley; David P. Ruschke; Kenneth J. Collier

(57) ABSTRACT

A method of preparing a polymer involving reacting at least one backbone carbamate (and/or optional urea) nitrogen of a thermoplastic polymer with a modification agent to form a modified polymer.

36 Claims, 15 Drawing Sheets

OTHER PUBLICATIONS

Capone, "Biostability of a non-ether polyurethane" *J. Biomater. Appl.*, 1992;7(2):108-129.

Caraculacu et al., "A new method for a kinetic study of reactions between di-isocyanates and alchols. Part 1. Symmetrical di-isocyanates" *J. Chem. Soc., Perkin Trans. 2*, 1990;8:1343-1348.

Coury et al., "Biostability considerations for implantable polyurethanes" *Life Support Syst.*, 1987;5(1):25-39.

Coury et al., "Factors and interactions affecting the performance of polyurethane elastomers in medical devices" *J. Biomater. Appl.*, 1988;3(2):130-179.

Coury et al., "Degradation of materials in the biological environment" In *Biomaterials Science: An Introduction to Materials in Medicine*, Ratner et al., Academic Press, San Diego, CA 1996; pp. 243-281. Title page, copyright page, table of contents and pp. 243-281.

Digar et al., "Studies on cross-linked polyurethane acrylate-based electrolyte consisting of reactive vinyl/divinyl diluents" *Polymer*, 2002;43:1615-1622.

Dyer et al., "Thermal degradation of carbamates of methylenebis-(4-phenyl isocyanate)" *J. Am. Chem. Soc.*, 1958;80:5495-5498.

Fabris, "Thermal and oxidative stability of polyurethanes" In *Advances in Urethane Science and Technology*, Technomic, Lancaster, PA 1976. Title page, copyright page, table of contents and pp. 89-111.

"Guide to Elast-Eon™ Medical Polymers" [online]. Elastomedic Pty Ltd., Chatswood, NSW, Australia, Copyright 1999 [retrieved on Jul. 17, 2006]. Retrieved from the Internet: <http://web.archive.org/web/20010408002932/www.elastomedic.com/material/guide_to_polymers.html>; 2 pgs.

Gunatillake et al., "Poly(dimethylsiloxane)/poly(hexamethylene oxide) mixed macrodial based polyurethane elastomers. I. Synthesis and properties" *J. Appl. Polym. Sci.*, 2000;76(14):2026-2040. (Published online Apr. 19, 2000).

Kondo et al., "Studies on development of sufficiently chemoselective N-acylation reagents: N-Acyl-N-(2,3,4,5,6-pentafluorophenyl) methanesulfonamides" *Tetrahedron*, 2000;56(32):5843-5856.

Lamba et al., *Polyurethanes in Biomedical Applications*, CRC Press, Boca Raton, FL 1998. Title page, copyright page and table of contents; 7 pages total.

Lu et al., "Reactivity of common functional groups with urethanes: Models for reactive compatibilization of thermoplastic polyurethane blends" *J. Polym. Sci., Part A: Polym. Chem.*, 2002;40(14):2310-2328.

Martin et al., "New methods for the assessment of in vitro and in vivo stress cracking in biomedical polyurethanes" *Biomaterials*, 2001;22(9):973-978.

Martin et al., "Polydimethylsiloxane/polyether-mixed macrodial-based polyurethane elastomers: biostability" *Biomaterials*, 2000;21(10):1021-1029.

Matuszak et al., "Hydrolysis of linear polyurethanes and model monocarbamates" *J. Pol. Sci., Pol. Chem. Ed.*, 1973;11(7):1683-90.

Mazzu et al., "Determination of extractable methylene dianiline in thermoplastic polyurethanes by HPLC" *J. Biomed. Mater. Res.*, 1984;18(8):961-968.

"Polyurethane Biomaterials From CT BioMaterials" [online]. Cardio Tech International, Inc., Woburn, MA, Copyright 1999 [retrieved on Jul. 17, 2006]. Retrieved from the Internet: <http://web.archive.org/web/20010205013300/www.cardiotech-inc.com/biomatr.htm>; 6 pgs.

Qin et al., "Synthesis and characterization of model urethane compounds" *Macromolecules*, 1985;18:553-557.

Reed et al., "A solution grade biostable polyurethane elastomer: ChronoFlex® AR" *J. Biomater. Appl.*, 1994;8(3):210-236.

Salvatore et al., "Efficient and selective N-alkylation of carbamates in the presence of $Cs_2CO_3$ and TBAI" *Tetrahedron Lett.*, 2001;42(10):1799-1801.

Sbarbati delGuerra et al., "In vitro biocompatibility of fluorinated polyurethanes" *J. Mater. Sci.: Mater. Med.*, 1994;5(6-7):452-456.

Schubert et al., "Role of oxygen in biodegradation of poly(etherurethane urea) elastomers" *J. Biomed. Mater. Res.*, 1997;34(4):519-530.

Smith et al., eds. *March's Advanced Organic Chemistry*, 5th ed., John Wiley & Sons, Inc., New York, NY 2001. Title page, copyright page and table of contents; 4 pages total.

Stern et al., "Derivatization of a new poly(ether urethane amide) containing chemically active sites" *Biomaterials*, 1995;16(1):17-23.

Stokes et al., "The in vivo auto-oxidation of polyether polyurethane by metal ions" *J. Biomater. Sci. Polym. Ed.*, 1990;1(3):207-230.

Stokes, "Polyether polyurethanes: biostable or not?" *J. Biomater. Appl.*, 1988;3(2):228-259.

Stokes et al., "Autooxidative degradation of implanted polyether polyurethane devices" *J. Biomater. Appl.*, 1987;1(4):411-448.

Szycher et al., "In vivo testing of a biostable polyurethane" *J. Biomater. Appl.*, 1991;6(2):110-130.

Szycher, "Biostability of polyurethanes: a critical review" In *Blood Compatible Materials and Devices*, Technomic Publishing Co., Lancaster, PA 1991. Title page, copyright page, table of contents and pp. 33-85.

Takahara et al., "Effect of soft segment chemistry on the biostability of segmented polyurethanes. I. In vitro oxidation" *J. Biomed. Mater. Res.*, 1991;25(3):341-356.

Tanzi et al., "Chemical stability of polyether urethanes versus polycarbonate urethanes" *J. Biomed. Mater. Res.*, 1997;36(4):550-9.

"Thermoplastic Silicone-Urethane Copolymers" [online]. The Polymer Technology Group, Inc., Berkeley, CA, Copyright 2003 [retrieved on Jul. 17, 2006]. Retrieved from the Internet: <http://www.polymertech.com/materials/siliconeurethanes.html>; 8 pgs.

Tonelli et al., "New fluorinated thermoplastic elastomers" *J. Appl. Polym. Sci.*, 1996;59(2):311-327.

Travnicek et al., "A new routine for the synthesis of N-substituted-N-(sulfonyl) bromoacetamides with $ZnCl_2$ as a catalyst" *Molecules*, 1999;4:238-244.

"Typical Physical Properties of Pellethane" The Dow Chemical Company, Midland, MI, Published Aug. 2001 (9 pgs).

Yang et al., "Totally implantable artificial hearts and left ventricular assist devices: selecting impermeable polycarbonate urethane to manufacture ventricles" *J. Biomed. Mater. Res.*, 1999;48(1):13-23.

Yang et al., "Thermal degradation of urethanes based on 4,4'-diphenylmethane diisocyanate and 1,4-butanediol (MDI/BDO)" *Polymer*, 1986;27(8):1235-1240.

Zdrahala, "Small caliber vascular grafts. Part II: Polyurethanes revisited" *J. Biomater. Appl.*, 1996;11(1):37-61.

Zdrahala et al., "Biomedical applications of polyurethanes: a review of past promises, present realities, and a vibrant future" *J. Biomater. Appl.*, 1999;14(1):67-90.

"Medical Urethanes—Selection Guide" datasheet [online]. Lubrizol Advanced Materials, Inc., Cleveland, OH, Jun. 2007 [retrieved on Oct. 9, 2007]. Retrieved from the Internet:<URL:http://www.estane.com/guides/medical-urethanes.pdf>; 1 pg.

"Technical Information" datasheet [online]. Lubrizol Advanced Materials, Inc., Cleveland, OH, Jun. 2007 [retrieved on Oct. 9, 2007]. Retrieved from the Internet:<URL:http://www.estane.com/brochures/medical-technical.pdf>; 15 pgs.

"Thermedics Medical-Grade Resins—Selection Guide" datasheet. Thermedics, Inc. Polymer Products, Woburn, MA, Mar. 1998; 3 pgs.

"Typical Physical Test Data" datasheet. Noveon Thermedics Polymer Products, Wilmington, MA, Oct. 2003; 14 pgs.

* cited by examiner

MODIFICATION OF THERMOPLASTIC POLYMERS

RELATED APPLICATION

This application claims the benefit of U.S. Provisional Patent Application Ser. No. 60/664,767, filed Mar. 24, 2005, which is incorporated herein by reference in its entirety.

BACKGROUND

Due to a large number of formulations that may be used to prepare polyurethanes, polymers having a wide range of chemical and physical properties are possible. Physical properties can range from hard, rigid thermosetting materials to softer thermoplastic elastomers. Chemical properties may be tailored to control durability and chemical stability. Thus, polyurethanes have been extensively studied for use, and found wide applicability in medical applications, for example.

A number of thermoplastic polyurethanes exhibit a unique combination of biocompatibility, toughness, biostability, and surface functionality that has led to widespread use in implantable medical devices, such as pacemaker leads, blood bags, catheters, bladders, and artificial hearts. The elastomeric properties of certain polyurethanes also make them good potential candidates for applications where interaction with, and the mimicing of, soft tissue are desired. This is particularly true for vascular grafts.

Thermoplastic polyurethanes currently used in cardiovascular prosthesis mainly suffer from two drawbacks: (1) unproven long-term biostability; and (2) excessive dilation (plastic deformation) especially when used as porous implants. Both these negative aspects can be attributed to (among other factors) the weak nature of hydrogen bonding resulting in microphase separation.

Previous attempts to address the problem of improving the chemical and mechanical stability of thermoplastic polyurethanes include: (1) changing the soft-segment from ether to hydrocarbon or siloxane based materials; (2) modifying thermoplastic polyurethanes by reacting them with diisocyanates and unsaturated monomers in an extruder; or (3) modifying thermoplastic polyurethanes by blending them with acrylic monomers in an extruder to render them crosslinked. Although some degree of success has been achieved, these methods would not be useful in a medical application where very specific control over the modification and crosslinking is desired.

SUMMARY OF THE INVENTION

The present invention is aimed at modifying (e.g., improving) the chemical properties (e.g., stability), biological properties (e.g., biostability) and/or mechanical properties (e.g., elastic response) of thermoplastic polymers that include urethane groups (having backbone carbamate nitrogen atoms) and optionally urea groups (having backbone urea atoms). This is done through the use of a modification agent that reacts at backbone carbamate (and/or optional urea) nitrogen atoms. Such modified polymers are then optionally molded into the desired shape and then preferably crosslinked. Preferably, such crosslinked polymers are biocompatible.

The modified thermoplastic polymers of the present invention may also be combined with additional components, which are added before or during processing to enhance the properties of the final product. These additional components may include, for example, initiators (e.g., free radical initiators) and polymerizable monomers.

The modified polymers of the present invention are preferably suitable for use in the manufacturing of medical devices, whether extracorporeal or implantable. Examples include vascular grafts (bypass and replacement), intravascular grafts, synthetic heart valves, artificial hearts, blood pumps, ventricular assist devices, pacemaker leads and connector blocks, breast augmentation devices, and sewing rings for heart valves or heart valve prostheses.

In one embodiment, the present invention provides a method of preparing a polymer that includes: providing a thermoplastic polymer that includes urethane groups having backbone carbamate nitrogen atoms, and optionally urea groups having backbone urea nitrogen atoms; reacting at least one backbone carbamate nitrogen atom and/or optional backbone urea nitrogen atom of the thermoplastic polymer with a modification agent to form a modified polymer; wherein the modification agent has a formula X—R—(Y)$_a$, wherein: X includes an electrophilic center reactive with the backbone carbamate nitrogen and/or optional urea nitrogen on the thermoplastic polymer; R is a bond or an organic group; each Y is independently a crosslinkable group; and a is 1 to 3. Preferably, no greater than 50% of the backbone carbamate nitrogen atoms and/or the optional backbone urea nitrogen atoms are reacted with the modification agent.

In another embodiment, the present invention provides a method that includes: providing a thermoplastic polymer including urethane groups having backbone carbamate nitrogen atoms, and optionally urea groups having backbone urea nitrogen atoms; reacting no greater than 20% of the backbone carbamate nitrogen atoms and/or the optional backbone urea nitrogen atoms of the thermoplastic polymer with a modification agent to form a modified polymer; wherein the modification agent has a formula X—R—(Y)$_a$, wherein: X includes a carboxylic acid, activated carboxylic acid, acid halide, anhydride, ester, amide, isocyanate, sulfonic ester, succinimidyl ester, 2,3,5,6-tetrafluorobenzoyl, acyl azide, acyl nitrile group, or combinations thereof; R is a bond or a linear or branched hydrocarbon group, ester group, amide group, ether group, amine group, or combinations thereof; each Y independently a vinyl, substituted vinyl, silane, or substituted silane group; and a is 1 to 3; and activating the modified polymer to form a crosslinked polymer.

The present invention also provides polymers preparable by the methods described herein. Such polymers are suitable for use in various medical devices.

Definitions

As used herein, the terms "a," "an," "one or more," and "at least one" are used interchangeably.

As used herein, the term "and/or" means one or both of the recited elements can be present/acted upon (e.g., a modification agent can react with carbamate nitrogens, urea nitrogens, or both).

As used herein, the terms "comprises" and variations thereof do not have a limiting meaning where these terms appear in the description and claims.

As used herein, a "biomaterial" or "biocompatible material" may be defined as a material that is substantially insoluble in body fluids and tissues and that is designed and constructed to be placed in or onto the body or to contact fluid or tissue of the body. Ideally, a biocompatible material will not induce undesirable reactions in the body such as blood clotting, tissue death, tumor formation, allergic reaction, foreign body reaction (rejection) or inflammatory reaction; will have the physical properties such as strength, elasticity, permeability, and flexibility desired to function for the intended purpose; can be purified, fabricated, and sterilized easily; and will substantially maintain its physical properties and function during the time that it remains implanted in or in contact with the body.

As used herein, "crosslink" refers to a covalent linkage between different polymers or polymer chains or between different regions of the same polymer (chains) or between the polymer and polymerizable monomers.

As used herein, "initiator" refers to a species that effects a chemical reaction upon activation.

As used herein, a "medical device" may be defined as an article that has surfaces that contact blood or other bodily tissues in the course of their operation. This can include, for example, extracorporeal devices for use in surgery such as blood oxygenators, blood pumps, blood sensors, tubing used to carry blood, and the like, which contact blood, which is then returned to the patient. This can also include implantable devices such as vascular grafts, stents, electrical stimulation leads, heart valves, orthopedic devices, catheters, guide wires, shunts, sensors, replacement devices for nucleus pulposus, cochlear or middle ear implants, intraocular lenses, and the like.

As used herein, "(meth)acrylate" is a shorthand reference to acrylate and methacrylate, and "(meth)acrylic" is a shorthand reference to acrylic and methacrylic.

As used herein, the term "organic group" refers to a hydrocarbyl group (aliphatic and/or aromatic) optionally including other atoms (e.g., heteroatoms) or groups (e.g., functional groups) replacing the carbon and/or hydrogen atoms. The term "aliphatic group" means a saturated or unsaturated linear (i.e., straight chain), cyclic, or branched hydrocarbon group. This term is used to encompass alkyl (e.g., —CH$_3$) (or alkylene if within a chain such as —CH$_2$—), alkenyl (or alkenylene if within a chain), and alkynyl (or alkynylene if within a chain) groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "aromatic group" or "aryl group" means a mono- or polynuclear aromatic hydrocarbon group. These hydrocarbon groups may be substituted with heteroatoms, which can be in the form of functional groups. The term "heteroatom" means an element other than carbon (e.g., nitrogen, oxygen, sulfur, chlorine, etc.).

As used herein, "photoinitiator" refers to a species that absorbs light and effects a chemical reaction.

As used herein, a "thermoplastic polymer" is one that will melt and flow when heated and reform substantially the same material upon cooling. Moreover, the thermoplastic polymer includes urethane and optional urea groups.

As used herein, the term "T$_g$" may be defined as the glass transition temperature, which is the temperature at which a polymer changes from a hard glassy to a soft rubbery state or vice versa.

As used herein, the term "solvent" refers to an organic or inorganic liquid capable of at least partially dissolving or swelling the thermoplastic polymer.

As used herein, the term "non-solvent" refers to an organic or inorganic liquid incapable of dissolving the thermoplastic urethane. The "non-solvent" may also have some ability to swell the thermoplastic polymer, and may be used to recover (e.g., precipitate) the dissolved polymer from solution by addition of the non-solvent to the polymer solution (or vice versa).

DETAILED DESCRIPTION OF ILLUSTRATIVE EMBODIMENTS

The current invention provides a method of chemically modifying thermoplastic polymers that include urethane groups and optionally urea groups. Such chemical modification results in modification of the chemical, biological, and/or mechanical properties of the polymer. Preferably, such chemical modification results in improving the chemical/biological stability and mechanical properties (e.g., elastic response) of the polymer. This is done by functionalizing the backbone carbamate (and/or the optional urea) nitrogen atoms of the polymer.

Such modified polymers are then optionally formed (e.g., molded) into a desired shape and then preferably crosslinked (or the forming and crosslinking can occur substantially simultaneously). Preferably, such crosslinked polymers are biocompatible.

Figure 1:
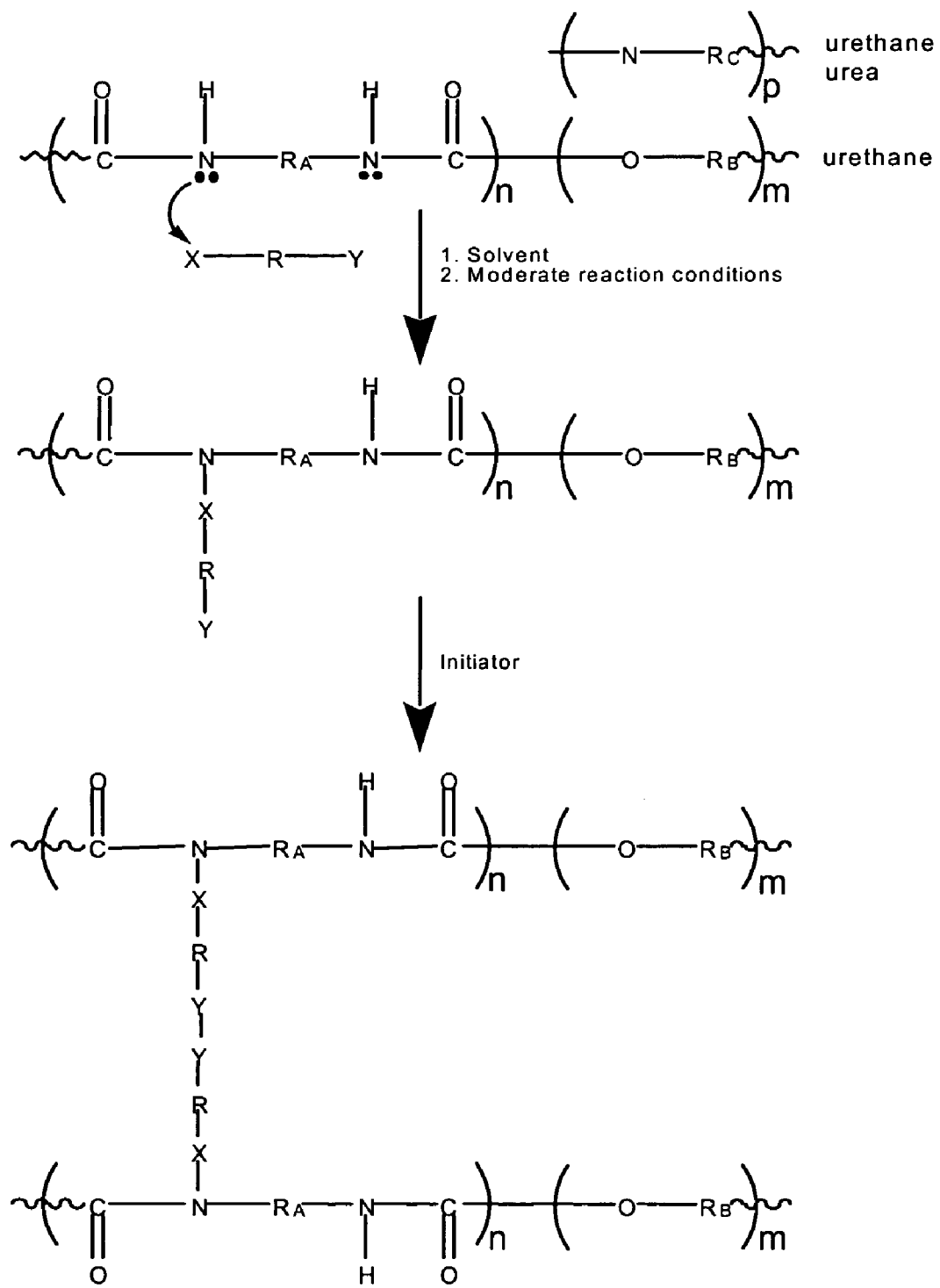
FIG. 1 is a representation of the generic thermoplastic polymer modification scheme. In this representation, X—R—Y is the modifying species. X is the electrophile capable of attack by nucleophile, for example, attack by carbamate nitrogen electron pair or its corresponding anion. Y is the reactive group capable of reacting with itself. R$_A$ is the diisocyanate (hard segment). R$_B$ is the diol (soft segment). R$_C$ is a diamine used in an alternative embodiment.
Figure 2:
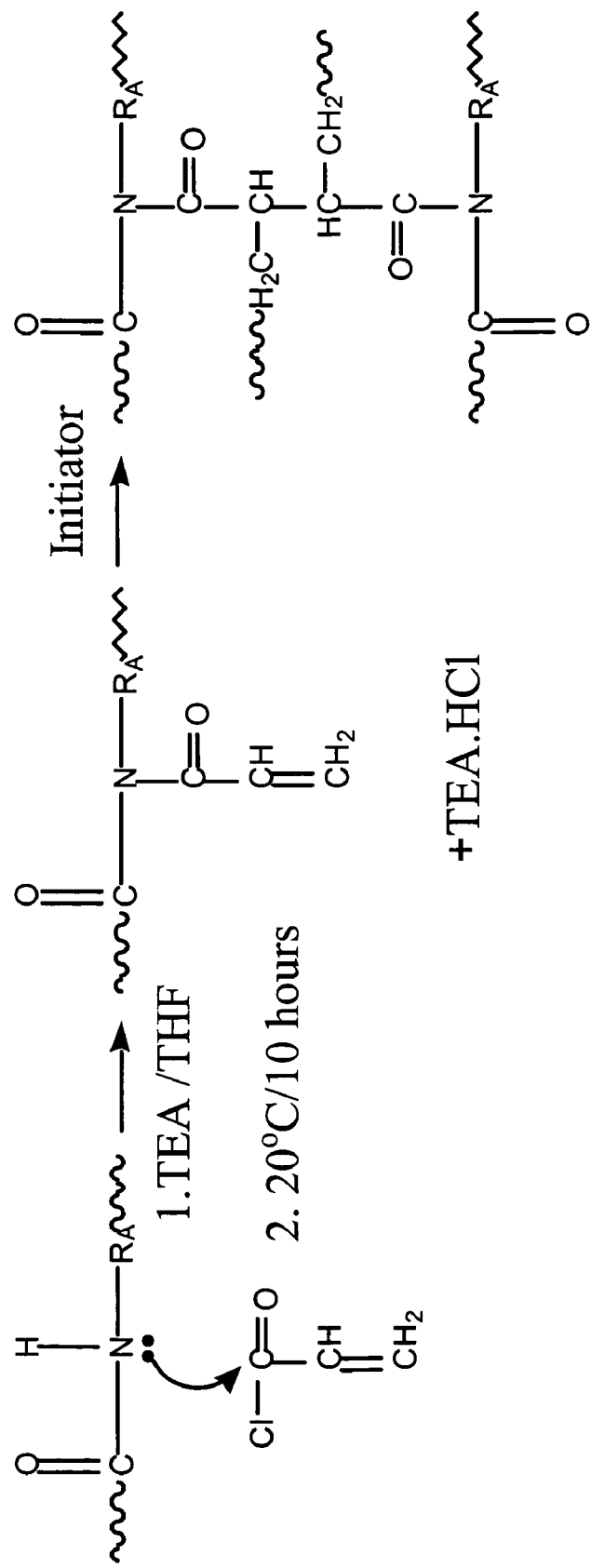
FIG. 2 is a representation of the thermoplastic polymer modification scheme with acryloyl chloride.
Figure 3:
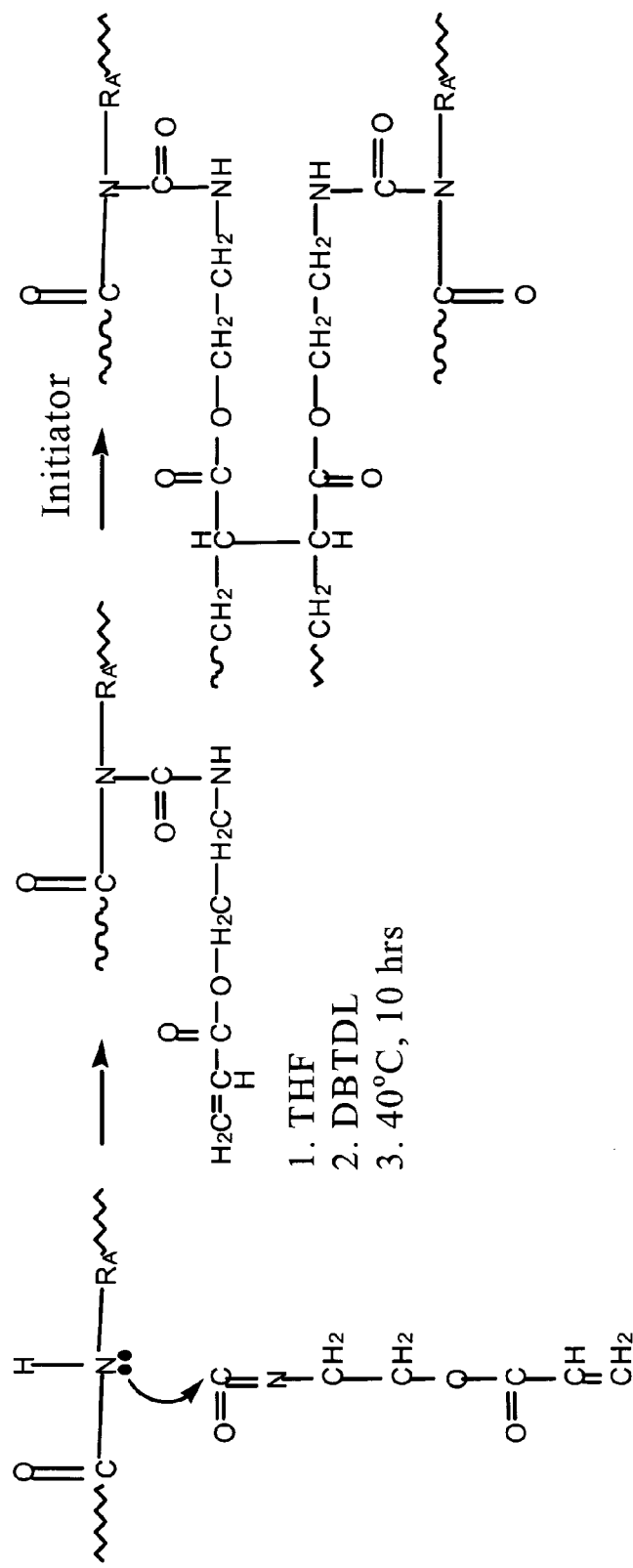
FIG. 3 is a representation of the thermoplastic polymer modification scheme with isocyanatoethylacrylate.
Figure 4:
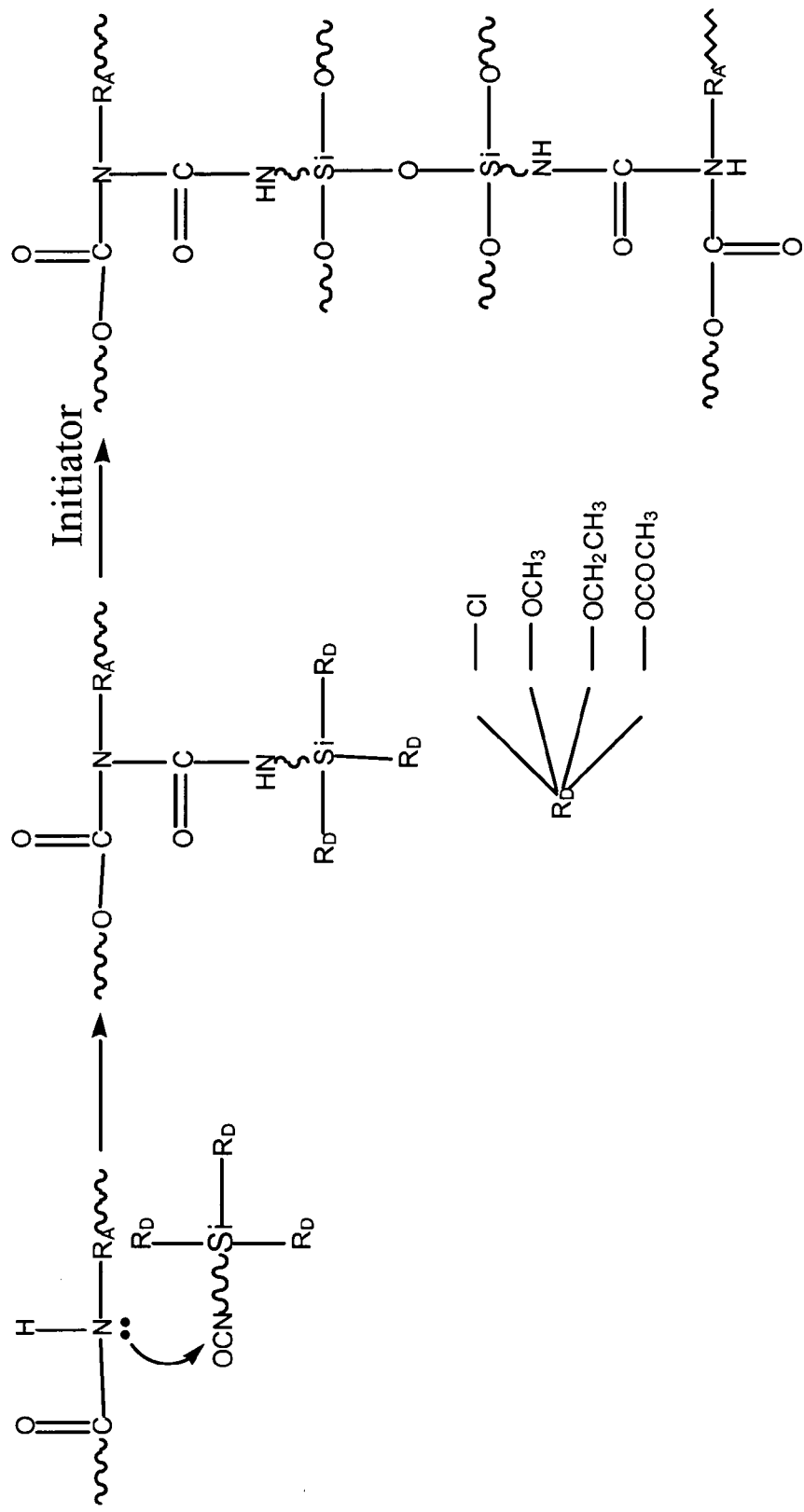
FIG. 4 is a representation of the thermoplastic polymer modification scheme with isocyanatosilanes.

Suitable modification agents have a formula X—R—(Y)$_a$, wherein X includes an electrophilic center reactive with the backbone carbamate (and/or the urea) nitrogen on the thermoplastic polymer; R is a bond or an organic group; each Y is independently a crosslinkable group; and a is 1 to 3. In certain embodiments, for example, a thermoplastic polymer is reacted with monomeric species containing (a) a first group capable of coupling to the thermoplastic polymer (i.e., the X group), and (b) a second group that is unreactive during modification but capable of crosslinking (i.e., the Y group(s)). Preferably, the Y group(s) provide crosslinking sites that can be activated subsequent to further processing steps (see, e.g., FIG. 1). More specifically, in one embodiment, acryloyl chloride, 4-pentenoyl chloride, isocyanatoethylacrylate, or isocyanatosilanes may be used as the modification agents (see, e.g., FIG. 2-4). The modified thermoplastic polymer is then typically isolated, purified, and processed into the desired shape by conventional means.

The modified thermoplastic polymers of the present invention may also be combined with additional components, which are added before or during processing to enhance the properties of the final product. These additional components may include, for example, initiators (e.g., free radical initiators in the case of unsaturated hydrocarbon Y groups (e.g., a vinyl, substituted vinyl), water or other suitable bases in the case of silane Y groups) and polymerizable monomers. The application of an initiator and initiation source subsequently affects the crosslinking of the polymer through covalent bonds (as opposed to the weak hydrogen bonds present in thermoplastic polymers). The extent of modification and subsequent crosslinking, which determines the mechanical properties (and to some extent the chemical stability) of the polymer, is optimized for the manufacturing of the specific device.

The methods of the present invention include reacting at least one backbone carbamate (and/or urea) nitrogen atom of a thermoplastic polymer with a modification agent to form a modified polymer. One or more different modification agents can be used to modify a thermoplastic polymer, although typically, one is used to modify a thermoplastic polymer.

The number of backbone carbamate (and/or optional urea) nitrogen atoms that react with the modification agent is typically at least two percent. Preferably, the percentage of backbone carbamate (and/or optional urea) nitrogens that react with the modification agent is at least four percent. In certain embodiments, the number of backbone carbamate (and/or optional urea) nitrogen atoms that react with the modification agent is no greater than fifty percent. Preferably, the percentage of backbone carbamate (and/or optional urea) nitrogens that react with the modification agent is no greater than twenty percent. More preferably, the percentage of backbone carbamate (and/or optional urea) nitrogens that react with the modification agent is no greater than fifteen percent.

The stoichiometry between the thermoplastic polymer and the modification agent is dependent on the carbamate and/or urea nitrogen content of the polymer and the desired level of modification and subsequent crosslinking. For example, the amount of modification agent to thermoplastic polymer is at least 0.08 millimole (mmol) modification agent per gram (g) of a thermoplastic polymer, such as PELLETHANE 2363-80AE, more preferably at least 0.12 mmol/g, and even more preferably at least 0.16 mmol/g. Preferably, the amount of modification agent to thermoplastic polymer is no greater than 4.0 millimoles modification agent per gram thermoplastic polymer such as PELLETHANE 2363-80AE, more preferably no greater than 3.5 mmol/g, even more preferably 3.25 mmol/g, even more preferably no greater than 3.0 mmol/g, even more preferably no greater than 2.5 mmol/g, even more preferably no greater than 2.25 mmol/g, even more preferably no greater than 2.0 mmol/g, and in certain situations preferably no greater than 1.0 mmol/g. Those skilled in the art will understand that the optimum amount of modification reagent (and base) are dependant on the stoichiometry and other properties of the polymer to be modified. These values may therefore be different for different polymers.

The reaction of a thermoplastic polymer with a modification agent to form a modified polymer is desirably performed in a solvent. The solvent, which may be an organic or inorganic liquid, at least partially dissolves or swells the thermoplastic polymer. Although solvents can be chosen that result in the formation of dispersions, preferred solvents substantially completely dissolve the thermoplastic polymer. Examples of such solvents are described herein below.

Organic or inorganic liquids that are herein referred to as "non-solvents" can be used to recover (e.g., precipitate), isolate, and preferably purify the modified polymer. A typical non-solvent has no significant solubilizing or swelling effect on the thermoplastic polymer Examples of such non-solvents are described herein below. Furthermore, a solvent for one thermoplastic polymer may be a non-solvent for another thermoplastic polymer.

In certain embodiments, methods of the present invention can involve treating the thermoplastic polymer with a basic reagent before or during the addition of the modification agent. Examples of basic reagents include triethylamine, sodium hydride, butyllithium, 1,8-diazobicyclo[5.4.0]undec-7-ene (DBU), 1-4-diazobicyclo[2.2.2]octane (DABCO), Hünigs base, dimethylaminopyridine (DMAP), or 1,5-diazobicyclo[4.3.0]non-5-ene (DBN). Various combinations of such basic reagents can be used if desired.

The amount of basic reagent is dependent on the carbamate and/or urea nitrogen content of the polymer, the basic reagent used, and the desired level of modification and subsequent crosslinking of the polymer, and can be determined by one of skill in the art. Typically, if used, the amount of basic reagent is at least 0.003 mmol basic reagent per gram of a thermoplastic polymer, such as PELLETHANE 2363-80AE, preferably at least 0.008 mmol/g, more preferably at least 0.02 mmol/g, more preferably at least 0.03 mmol/g, even more preferably at least 0.08 mmol/g, even more preferably at least 0.10 mmol/g, even more preferably at least 0.16 mmol/g, and even more preferably at least 0.33 mmol/g. If used, the amount of basic reagent is typically no greater than 6 mmol/g, preferably no greater than 4 mmol/g, more preferably no greater than 3.5 mmol/g, even more preferably no greater than 3 mmol/g, more preferably no greater than 2.5 mmol/g, even more preferably no greater than 2.0 mmol/g, even more preferably no greater than 1.5 mmol basic reagent per gram of a thermoplastic polymer, such as PELLETHANE 2363-80AE.

Preferred conditions for forming the modified thermoplastic polymers include the use of an inert atmosphere (e.g., nitrogen, helium, or argon), and suitable conditions (e.g., temperatures and times) to result in the desired level of modification of the carbamate (and/or urea) nitrogens.

Typically, the temperature of the reaction is at least −40° C., preferably at least −10° C., and more preferably at least −5° C. Typically, the temperature of the reaction is no greater than 160° C., preferably no greater than 50° C., and more preferably no greater than 25° C.

Typically, the modification reaction is carried out for at least 1 hour, and preferably at least 2 hours. Typically, the reaction time is no more than 72 hours, more preferably no more than 48 hours, and even more preferably no more than 20 hours.

The methods of the present invention preferably include activating the modified polymer to at least partially crosslink the modified polymer and form a crosslinked polymer. It is desirable to substantially completely crosslink the modified polymer, although this is not necessarily required. Such crosslinking occurs by reacting the crosslinkable Y groups of the modification agent with themselves and/or optional polymerizable monomers (e.g., mono- or poly-(meth)acrylates, acrylamides, or combinations thereof).

The step of activating to form a crosslinked polymer can include heating, irradiating, moisture treating, or combinations thereof.

Preferred conditions for crosslinking of the modified thermoplastic polymers include the use of an inert atmosphere (e.g., nitrogen, helium, or argon), and suitable conditions (e.g., temperatures and times) to result in the desired level of crosslinking of the polymer. Typically, such crosslinking occurs through a free radical mechanism, which can be induced through radiation (e.g., by irradiating) or elevated temperature (e.g., by heating). Alternatively crosslinking may occur through a moisture cure mechanism (e.g., by moisture treating).

Typically, for radiation-induced free radical crosslinking, the temperature of the reaction is at least 0° C., preferably at least 10° C., and more preferably at least 20° C. Typically, the temperature of the reaction is no greater than 100° C., preferably no greater than 50° C., and more preferably no greater than 30° C.

Typically, for radiation-induced free radical crosslinking, the reaction is carried out for at least 1 minute, and preferably at least 5 minutes. Typically, the reaction time is no more than 20 minutes, and more preferably no more than 10 minutes.

For temperature-induced free radical crosslinking, the reaction temperature depends upon the chosen initiator. Typically, for example, for dicumyl peroxide, the temperature of the reaction is at least 100° C., preferably at least 120° C. Typically, for dicumyl peroxide, for example, the temperature of the reaction is no greater than 200° C., preferably no greater than 160° C., and more preferably no greater than 140° C.

Typically, for temperature-induced free radical crosslinking using dicumyl peroxide, for example, the reaction is carried out for at least 1 minute, and preferably at least 6 hours. Typically, for temperature-induced free radical crosslinking using dicumyl peroxide, for example, the reaction time is no more than 20 hours, and more preferably no more than 8 hours.

Preferred conditions for moisture-cured crosslinking of the modified thermoplastic polymers include the use of a moisture-containing atmosphere and suitable temperatures and times to result in the desired level of crosslinking of the polymer.

Typically, for moisture-cured crosslinking, the temperature of the reaction is at least 10° C., preferably at least 15° C., and more preferably at least 20° C. Typically, the temperature of the reaction is no greater than 200° C., preferably no greater than 180° C., and more preferably no greater than 100° C.

Typically, for moisture-cured crosslinking, the reaction is carried out for at least 1 minute (min), and preferably at least 1 hour. Typically, the reaction time is no more than 72 hours, more preferably no more than 48 hours, and even more preferably no more than 24 hours.

As mentioned above, modified thermoplastic polymers of the present invention may also be combined with additional components, which are added before or during further processing (e.g., activating to crosslink the modified polymer) to enhance the properties of the final product.

Preferably, for free radical crosslinking of the modified thermoplastic polymers, an initiator (or combination of initiators) is used to enhance crosslinking. If used, an initiator is present in an amount of at least 0.001 part per hundred parts thermoplastic polymer (pph), more preferably at least 0.01 pph, and even more preferably at least 0.5 pph. If used, an initiator is present in an amount of no greater than 5 pph, more preferably no greater than 4 pph, and even more preferably no greater than 3 pph.

Preferably, for the moisture-cured crosslinking of the modified thermoplastic polymers, the moisture (water) is supplied by the atmosphere or by immersion in water. Alternatively, moisture (water) can be supplied during or after the manufacture of the device and may also be in the form of steam.

The methods of the present invention can optionally include adding one or more monomers before or during further processing (e.g., activating to crosslink the modified polymer) of the modified polymer. If used, preferably, a monomer is present in an amount of at least 0.001 parts per hundred parts thermoplastic polymer (pph), more preferably at least 0.01 pph, and even more preferably at least 0.5 pph. If used, preferably, a monomer is present in an amount of no greater than 5 pph, more preferably no greater than 4 pph, and even more preferably no greater than 3 pph.

Thermoplastic Polymers

Suitable thermoplastic polymers useful in the methods of the present invention include urethane groups and optionally urea groups. Preferably, such polymers are polyurethanes and polyurethane ureas. More preferably, such polymers are polyurethanes. Such polymers can be linear or branched.

Polyurethanes are polymers that are used to form a broad range of products. Polyurethanes are generally formed by mixing two primary ingredients during processing. For commonly used polyurethanes, the two primary ingredients are a polyisocyanate (typically, a diisocyanate, for example, diphenylmethane diisocyanate monomer ("MDI") and toluene diisocyanate ("TDI") and their derivatives), which forms part of the "hard segments," and a polyol (typically, a polymeric diol, for example, a polyester diol or a polyether diol), which form the "soft segments." However, if either the diisocyanate or the polymeric/oligomeric diol soft segment has a functionality greater than two, crosslinked polyurethanes will ensue.

A chain extender may also be added to improve the physical properties. The properties of segmented polyurethanes depend on their chemical nature and constitutive elements, on the manner in which these hard and soft segments are arranged in the bulk of the material, and on the nature of the interaction between these phases. The hard segments form glassy or semicrystalline domains dispersed in an amorphous or semicrystalline soft segment matrix. The hard domains act as reversible physical crosslinking sites and reinforcing fillers. As a result, segmented polyurethanes exhibit high moduli and elastic behavior normally associated with covalently crosslinked polymers.

In general, hard segments are responsible for tensile strength, hardness, permanent elongation, and compression set, while soft segments determine the elastic expansion and glass transition temperature ($T_g$).

Figure 5:
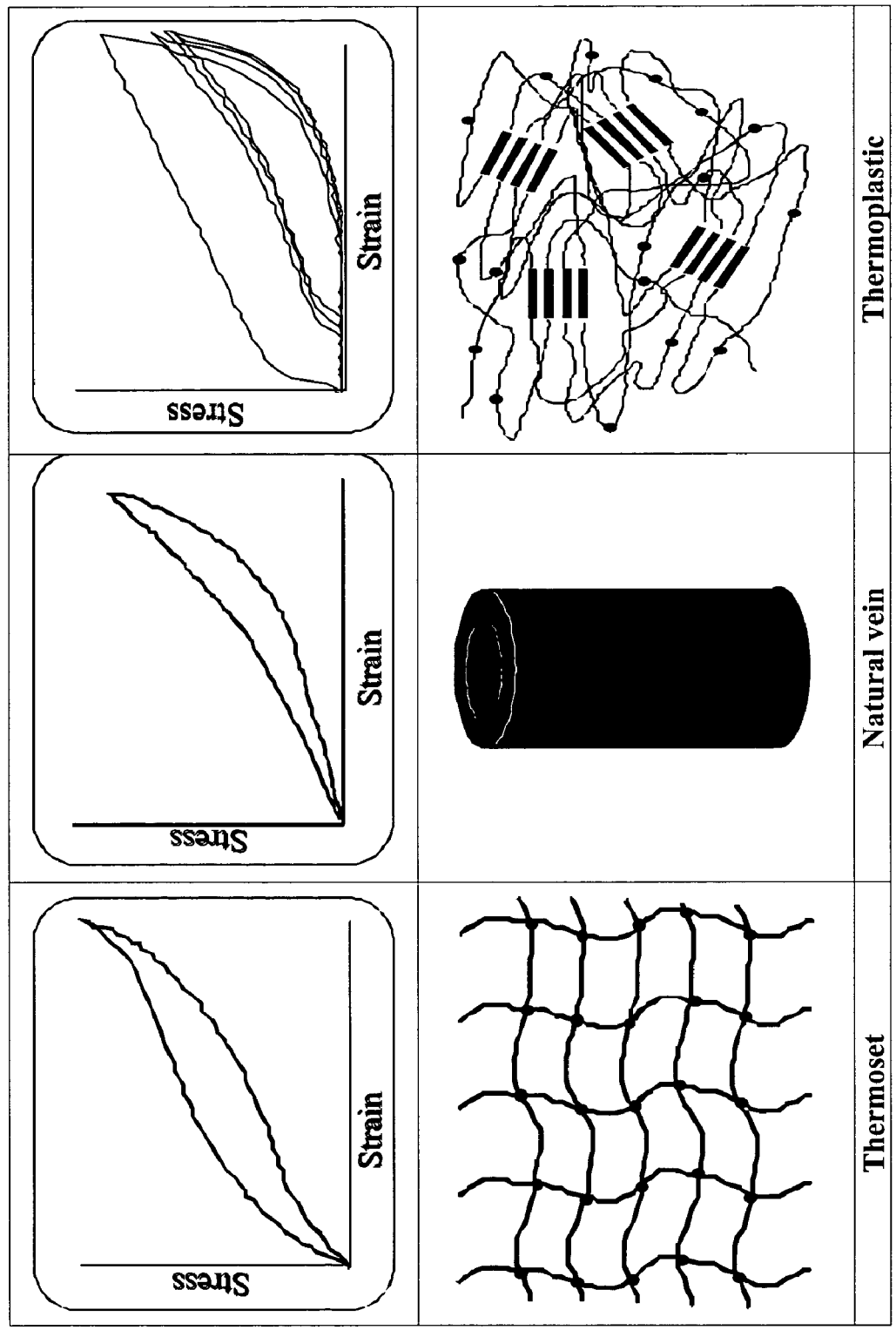
FIG. 5 is a representation of the elastic response of thermoset elastomers, natural veins and thermoplastic elastomers. The hysteresis and plastic deformation (unrecovered strain) of the thermoplastic elastomer material is clearly evident.

Polyurethane ureas exhibit good phase separation, which results in a moderate elastic response. As a consequence, polyurethane ureas and other "soft" grade polyurethanes suffer large energy losses (hysteresis) (e.g., FIG. 5) when compared to covalently crosslinked elastomers and natural tissue.

Over the last 30 years, advances have been made in manufacturing techniques and raw materials to improve the biostability of polyurethane elastomers. This has lead to the development of a number of new polyurethanes. However, metal induced oxidation (MIO) and biological environmental stress cracking (BESC) is a great concern when "soft" grade polyurethanes are used. Due to high surface to volume ratios, these problems are exacerbated in porous structures, such as tissue engineering (TE) scaffolds. The high surface to volume ratio will ultimately lead to an increase in degradation rate.

The end-use properties of polyurethanes can be controlled by the type of starting materials (polyisocyanates and polyols) used. For example, a thermoset (i.e., crosslinked molecular structure) is achieved by using a diisocyanate or a polymeric polyol with functionality greater than two. On the other hand, a thermoplastic is achieved by using diisocyanate or a polymeric polyol with functionality equal to two.

Additionally, the end-use characteristics of polyurethanes can also be controlled by different types of reactive chemicals and processing parameters. For example, catalysts are utilized to control polymerization rates. Depending upon the processing method, reaction rates can be very quick or may be on the order of several hours or longer (as in several coating systems). Consequently, a great variety of polyurethanes are suitable for different end-uses.

Apart from stoichiometry of the polyisocyanates and polyols, the reaction temperature, catalyst choice, and reaction medium may influence the reaction products. Generally, low temperatures (e.g., less than 50° C.) favor chain extension, while higher temperatures (e.g., 50-150° C.) promote crosslinking and branching reactions. Higher temperatures (e.g., greater than 150° C.) lead to dissociation of biuret and allophanate linkages and degradation of aromatic polyurethanes, while temperatures in excess of 220° C. will result in the decomposition of aliphatic urethanes. Catalysts that promote the reaction of isocyanates include sodium hydroxide, tertiary amines, and organometallic (especially tin) compounds. Choice of catalysts can effect the preferential reaction of isocyanates with the preferred species (such as diols) and minimize the reaction with others (e.g., urethanes and ureas) or vice versa. Although bulk polymerization is often used, solution polymerization in N,N-dimethylacetamide (DMAC), dimethylformamide (DMF), tetrahydrofuran (THF) and dimethylsulfoxide (DMSO) may also be employed. Some polymer grades are sold as concentrated solutions (less than 25%) in these solvents.

In certain embodiments, the thermoplastic polymer preferably includes: a soft segment derived from a polyester diol, a polycarbonate diol, a polyether diol, a polysiloxane diol, and/or a hydrocarbon diol; and a hard segment derived from an aliphatic and/or aromatic diisocyanate and a monomeric diol and/or diamine.

Suitable hard segments may include, for example, methylene bis(p-phenyl isocyanate), 2,4-toluene diisocyanate, 2,6-toluene diisocyanate, 1,5-naphthalene diisocyanate, methylene bis(toluene isocyanate), methylene bis(4,4-cyclohexyl isocyanate), 1,4-cyclohexane diisocyanate, 3-isocyanatomethyl-3,5,5-trimethylcyclohexyl isocyanate, hexamethylene diisocyanate, 1,6-diisocyanate-2,2,4-trimethylhexane, 1,6-diisocyanate-2,4,4-trimethylhexane, 1,3-bis(1-isocyanate-1-methylethyl)benzene, 1,4-bis(1-isocyanate-1-methylethyl)benzene, 1,1-methylenebis(4-isocyanatocyclohexane, 1,3-diisocyanatobenzene, 1,4-diisocyanatobenzene, 2,4-diisocyanato-1-methylbenzene, 1,3-diisocyanatomethylbenzene, and 1-isocyanato-2-(4-isocyanatophenyl)methylbenzene.

Suitable soft segments may include, for example, polyethylene adipate glycol, polycaprolactone, poly(ethylene oxide) glycol, polypropylene oxide glycol, poly(oxytetramethylene) glycol, polyhexamethylene carbonate glycol, and poly(dimethylsiloxane).

Chain extenders may be diols, which lead to polyurethane synthesis, or diamines, which lead to polyurethane urea synthesis. Suitable diol chain extenders leading to the formation of polyurethanes may include, for example, ethane diol, butane diol, and hexane diol. Suitable diamine chain extenders leading to the formation of polyurethane ureas may include, for example, ethylene diamine and polyoxyalkylene diamine.

Preferred polymers for use in the present invention include medical grade polyurethanes. Examples of suitable medical grade thermoplastic polyurethanes may include those available under the trade designations PELLETHANE (from Dow Chemicals, Midland, Mich.), VIALON (from Becton Dickinson, Franklin Lakes, N.J.), CORPLEX (from Corium International, Redwood City, Calif.), ERYTHROTHANE (from Biosearch, Raritan, N.J.), SRI series (from Stanford Research Institute, Menlo Park, Calif.), ESTANE (from Noveon Inc., Cleveland, Ohio), TEXIN (from Bayer Material Science AG, Leverkusen, Germany), TECHOTHANE and TECOPLAST (from Thermedics, Wilmington, Mass.), ELASTHANE (from Polymer Technology Group, Berkeley, Calif.), CHRONOTHANE (from CT Biomaterials, Wilmington, Mass.), ELAST-EON (from Elastomedic, AorTech Biomaterials Pty Ltd., Victoria, Australia), BIOMER (from Ethicon, Cornelia, Ga.), MITRATHANE (from Polymedica, Woburn, Mass.), SURETHANE (from Cardiac Control Systems, Palm Coast, Fla.), LYCRA (from DuPont, Wilmington, Del.), BIOSPAN (from Polymer Technology Group, Berkeley, Calif.), TM5 (from Toyobo, Osaka, Japan), CHRONOFLEX (from Polymedica, Woburn, Mass.), BIONATE, CORETHANE (from Polymer Technology Group, Berkeley, Calif.), TECOFLEX and TECHNOPHILLIC (from Thermedics, Wilmington, Mass.), Southern Research Institute Thermoplastic Polyurethane (Birmingham, Ala.), AKZO (from Akzo Nobel Polymer Chemicals LLC, Chicago, Ill.), CARBOTHANE (from Thermedics, Wilmington, Mass.), PURSIL and CARBOSIL (from Polymer Technology Group, Berkeley, Calif.), HYDROMER (from Hydromer, Branchburg, N.J.), HYDROTHANE, HYDROSLIP (from CardioTech International, Inc., Wilmington, Mass.), ENKA PUR (from Enka AG, Wuppertal, Germany), and THORALON (from Thoratec Corporation, Pleasanton, Calif.).

Modification Agents

Suitable modification agents have a formula $X—R—(Y)_a$, wherein X includes an electrophilic center reactive with the backbone carbamate (and/or optional urea) nitrogen atoms on the thermoplastic polymer; R is a bond or an organic group; each Y is independently a crosslinkable group; and a is 1 to 3 (preferably, a is 1).

In certain embodiments, X includes, for example, a carboxylic acid, activated carboxylic acid, acid halide, anhydride, ester, amide, isocyanate, sulfonic ester, succinimidyl ester, 2,3,5,6-tetrafluorobenzoyl, acyl azide, acyl nitrile group, or combinations thereof. Preferably, each X independently includes an —NCO, —COR$_1$, or combinations thereof.

If X is —C(O)R$_1$, then R$_1$ may include halogen, —OH, —OCH$_3$, —OCOCH$_3$, —NH$_2$, —NH$_3^+$, —OH$_2^+$, —OAC (i.e., OAc=OC(O)CH$_3$), —(C$_6$H$_5$), —(C$_6$F$_5$), —N$_3$, —N-hydroxy-succinimide, —H, —OSO$_2$(C$_6$H$_4$)CH$_3$, —OSO$_2$(C$_6$H$_4$)Br, —OSO$_2$(C$_6$H$_4$)NO$_2$, —OSO$_2$CH$_3$, —OSO$_2$CF$_3$, —OSO$_2$C$_4$H$_9$, —OSO$_2$CH$_2$CF$_3$, and —OSO$_2$(C$_6$H$_4$)F. Preferably, R$_1$ is a halogen. More preferably, R$_1$ is chlorine.

Each Y may independently include a vinyl, substituted vinyl, silane, or substituted silane group. Preferably, each Y is independently —CR$_2$=CR$_3$R$_4$ or —Si(R$_5$)$_3$.

In certain embodiments, R$_2$, R$_3$, and R$_4$ are independently —H, —CH$_3$, —(CR$_6$R$_7$)$_b$CH$_3$ (wherein b is preferably 0 to 10, and more preferably 0 to 5), —C$_6$H$_5$, —C(O)R$_8$, and —OCH$_2$R$_9$.

In certain embodiments of the Y group, each R$_5$ is independently —OCH$_3$, —CH$_2$OCH$_3$, —O(CH$_2$)$_c$CH$_3$ (wherein c is preferably 0 to 5, and more preferably 0 to 3), and —OCO(CR$_{10}$R$_{11}$)$_d$CH$_3$ (wherein d is preferably 0 to 5, and more preferably 0 to 3). Preferably, R$_5$ is —CH$_2$OCH$_3$.

In certain embodiments of the Y group, R$_6$, R$_7$, R$_8$, and R$_9$ are each independently selected from the group consisting of —H, a halogen (i.e., F, Cl, Br, and I), or an organic group (preferably, containing up to fifty carbon atoms). Preferably, the organic group is a linear or branched aliphatic and/or aromatic group (e.g., alkyl, alkenyl, alkynyl, aryl, alkaryl, and aralkyl groups). In certain embodiments, R$_6$, R$_7$, R$_8$, and R$_9$ are independently —H, a halogen (preferably, F, Cl, or Br), a (C$_1$-C$_8$) linear or (C$_1$-C$_8$) branched aliphatic group, a (C$_6$-C$_8$) aromatic group, and combinations of the aliphatic and aromatic groups. In certain embodiments, R$_6$, R$_7$, R$_8$, and R$_9$ are independently —H, a halogen (preferably, Cl), or a (C$_1$-C$_8$) alkyl group.

In certain embodiments of the Y group, R$_{10}$ and R$_{11}$ are independently a saturated aliphatic or aromatic group. In certain embodiments, R$_{10}$ and R$_{11}$ are independently a (C$_1$-C$_8$) saturated aliphatic group or a (C$_6$-C$_8$) aromatic group.

In certain embodiments, each Y independently includes a (meth)acrylate group. In certain embodiments, Y is independently —CH=CH$_2$, —(CH$_3$)C=CH$_2$, or —Si(CH$_2$OCH$_3$)$_3$.

In some embodiments, R is a bond or includes, for example, a linear or branched aliphatic group and/or aromatic group, an ester group, an amide group, an ether group, an amine group, or combinations thereof. In some more preferred embodiments, R includes a (C$_1$-C$_{20}$) linear or branched aliphatic group and/or aromatic group optionally including one or more ester, amide, ether, or amine groups.

Preferably, R includes —CH$_2$—, —C$_6$H$_4$—, —(CR$_{12}$R$_{13}$)$_e$—, R$_{14}$OC(O)(CR$_{12}$R$_{13}$)$_e$—, —R$_{14}$C(O)O(CR$_{12}$R$_{13}$)$_e$—, R$_{14}$C(O)N(CR$_{12}$R$_{13}$)$_e$, —(CR$_{12}$R$_{13}$)$_e$—O—(CR$_{15}$R$_{16}$)$_f$—, —(CR$_{12}$R$_{13}$)$_e$—NH—(CR$_{15}$R$_{16}$)$_f$—, —(CH$_2$)$_2$—O—C(O)—, and combinations thereof; wherein: e is 1 to 5 (more preferably, 1 to 3); and f is 1 to 5 (more preferably, 1 to 3).

In certain embodiments, for such R groups, R$_{12}$, R$_{13}$, R$_{15}$, and R$_{16}$ are independently —H, a halogen (i.e., F, Cl, Br, and I), a linear or branched saturated or unsaturated aliphatic group, an aromatic group, or a combination of the aliphatic and aromatic groups. In certain embodiments, for such R groups, R$_{12}$, R$_{13}$, R$_{15}$, and R$_{16}$ are independently —H, a halogen, a (C$_1$-C$_{20}$) linear or branched saturated or unsaturated aliphatic group, a (C$_6$-C$_{20}$) aromatic group, or a combination of the aliphatic and aromatic groups. For certain embodiments, R$_{12}$, R$_{13}$, R$_{15}$, and R$_{16}$ are independently —H, a halogen (preferably, F, Cl, or Br), a (C$_1$-C$_{10}$) linear or branched alkyl group, a (C$_6$-C$_{12}$) aryl group, or a combination of the alkyl and aryl groups (e.g., alkaryl and aralkyl groups).

In certain preferred embodiments, R$_{12}$, R$_{13}$, R$_{15}$, and R$_{16}$ are independently —H, a halogen (preferably, F, Cl, or Br), a (C$_1$-C$_6$) linear or branched alkyl group, a (C$_6$-C$_{12}$) aryl group, or a combination of the alkyl and aryl groups (e.g., alkaryl and aralkyl groups). In certain preferred embodiments, R$_{12}$, R$_{13}$, R$_{15}$, and R$_{16}$ are independently —H, a (C$_1$-C$_4$) linear or branched alkyl group, a (C$_6$-C$_{12}$) aryl group, or a combination of the alkyl and aryl groups (e.g., alkaryl and aralkyl groups).

In certain embodiments for such R groups, each R$_{14}$ is independently a linear or branched saturated or unsaturated aliphatic group or an aromatic group. In certain preferred embodiments, each R$_{14}$ is independently a (C$_1$-C$_{12}$) linear or branched saturated or unsaturated aliphatic group (preferably, an alkyl or alkenyl group) or a (C$_6$-C$_{12}$) aromatic group. In certain more preferred embodiments, each R$_{14}$ is independently a (C$_1$-C$_6$) linear or branched alkyl group or a (C$_6$-C$_{12}$) aromatic group.

In certain preferred embodiments, R is —(CH$_2$)$_2$—, —(CH$_2$)$_3$—, or —(CH$_2$)$_2$—O—C(O)—.

Suitable modification agents may include, for example, acryloyl chloride, methacryloyl chloride, 4-pentenoyl chloride, isocyanatopropyl triethoxy silane, and isocyanotoethylacrylate.

Solvents and Non-solvents

Suitable solvents (inorganic or organic liquids) for use in methods of the present invention include those that are capable of at least partially dissolving or swelling the thermoplastic polymers. Preferred solvents are organic solvents. These may include, for example, acetic acid, acetic anhydride, acetone, acetonitrile, acrylonitrile, n-amyl alcohol, aniline, benzene, benzaldehyde, benzyl alcohol, n-butanol, butyl acetate, sec-butyl alcohol, chlorobenzene, chloroform, m-cresol, cyclohexane, cyclohexanone, dichloroethane, diethyl ether, diethylene glycol, N,N-dimethylacetamide, N,N-dimethylformamide, dimethylsulfoxide, 1,4-dioxane, ethanol, ethyl acetate, formic acid, n-hexane, methylene chloride, methyl ethyl ketone, N-methyl-2-pyrrolidone, nitrobenzene, nitromethane, phenol, n-propanol, propylene glycol, pyridine, sulfuric acid, tetrahydrofuran, toluene, triethanolamine, and trimethyl phosphate. Various combinations of such solvents can be used if desired.

Suitable non-solvents (inorganic or organic liquids) for use in methods of the present invention include those that will precipitate, for example, the modified polymer out of the reaction mixture. Preferred non-solvents are organic solvents. Examples of non-solvents include benzyl alcohol, n-butanol, sec-butyl alcohol, chlorobenzene, chloroform, cyclohexanone, diethyl ether, N,N-dimethylformamide, ethanol, formic acid, n-hexane, iso-propanol, n-propanol, methanol, methylene chloride, 1,1,2-trichloroethane, and xylene. Various combinations of such solvents can be used.

As will be understood by one of skill in the art, a solvent for one thermoplastic polymer may be a non-solvent for another thermoplastic polymer. Furthermore, the selection of solvent and non-solvent for the particular polymer can be readily determined by one of skill in the art.

Initiators

The methods of the present invention can further include combining the modified polymer with an initiator before activating the modified polymer to form a crosslinked polymer (and typically before forming the polymer into the desired shape). Preferably, the initiator is a free radical initiator. Suitable free radical initiators include thermal initiators, photoinitiators, redox initiators, and combinations thereof. Various combinations of initiators may be used if desired. For moisture curing, applicable, for example, to silane modifying agents, water acts as the initiator.

Examples of thermal free radical initiators include azo compounds, peroxides, peracids, peresters, percarbonates, peroxylates, and diketals.

Examples of photoinitiators include azo compounds, peroxy-compounds, acetophenones, benzophenones, acylphosphonates, diketones, and 2,2-dimethoxy-2-phenylacetophenone (DMPA).

Suitable azo compounds may include, for example, azonitriles, azoesters, azobis(isobutyronitrile), 2,2'-azobis[2-(5-methyl-imidazoline-2-yl)propane]dihydrochloride, and 2,2'-azobis(2-methylpropionamide)dihydrochloride.

Suitable peroxides may include, for example, hydroperoxides (e.g., t-butyl hydroperoxide), ketone peroxides, benzoyl peroxide, dicumyl peroxide, and lauroyl peroxide.

Examples of redox initiators include reducing agents with peroxides such as $Fe^{2+}+H_2O_2 \rightarrow Fe^{3+}+HO^-+HO$. or reducing agents and persulfates such as $Fe^{2+}+S_2O_8^{2-} \rightarrow Fe^{3+}+SO_4^{2-}+SO_4^-$.

Polymerizable Monomers

Suitable polymerizable monomers may be added to the modified thermoplastic polymer before it has been formed into the desired shape and before crosslinking to improve the extent of crosslinking. These are optional, and used where pendant chain mobility and/or low modification extents necessitate the use of small multifunctional monomers to bridge the distances between them (crosslinkable moieties).

Typically, one or more polymerizable monomers are combined with the modified polymer before activating the modified polymer to form a crosslinked polymer. Preferably, unsaturated polymerizable monomers may be used to crosslink modified polymers containing unsaturated groups. Suitable unsaturated polymerizable monomers include mono- or poly-(meth)acrylates, acrylamides, or combinations thereof.

Examples include, for example, allyl methacrylate, ethyleneglycol dimethacrylate, triethyleneglycol dimethacrylate, polyethyleneglycol dimethacrylate, 1,3-butanediol dimethacrylate, 1,4-butanediol dimethacrylate, 1,6-hexanediol dimethacrylate, glycerol dimethacrylate, diurethane dimethacrylate, trimethylolpropane trimethacrylate, trimethylolpropane triacrylate, neopentyl glycol dimethacrylate, neopentyl glycol diacrylate, dimethylolpropane dimethacrylate, and N,N-methylenebisacrylamide. Various combinations of such monomers can be used if desired.

Silane monomers (e.g., disilanes, trisilanes, and polysilanes) may also be used to crosslink polymers containing silane groups.

Additional Components

The modified thermoplastic polymers of the present invention may also include additional components, which are added before or during processing to enhance the final product. These additional components may include, for example, plasticizers, fillers, fibers, colorants, and processing aids.

The present invention is illustrated by the following examples. It is to be understood that the particular examples, materials, amounts, and procedures are to be interpreted broadly in accordance with the scope and spirit of the invention as set forth herein.

EXAMPLES

The following examples are given to illustrate, but not limit, the scope of this invention. Unless otherwise indicated, all parts and percentages are by weight and all molecular weights are weight average molecular weight. Unless otherwise specified, all chemicals used are commercially available from, for example, Sigma-Aldrich (St. Louis, Mo.).

| | ABBREVIATIONS, DESCRIPTIONS, AND SOURCES OF MATERIALS |
|---|---|
| AcCl | Acryloyl Chloride (Aldrich, Cat: A2, 410-9) |
| | Ammonium Chloride (Aldrich, Cat: 25, 413-4) |
| n-BuOH | 1-Butanol (Riedel-de Haën, Cat: 34931) |
| BA | Butyl Acrylate (Aldrich, Cat: 23, 492-3) |
| BuLi | Butyllithium (n-Butylithium) (Aldrich, Cat: 18, 617-1) |
| | Cyclohexanone (Riedel-de Haën, Cat: 24218) |
| DBTDL | Dibutyltin dilaurate (Aldrich, Cat: 29, 123-4) |
| DCM | Dichloromethane (Aldrich, Cat: 27, 099-7) |
| DCP | Dicumyl Peroxide (Aldrich, Cat: 53, 171-5) |
| | Diethyl Ether (Aldrich, Cat: 44, 354-9) |
| Hünig's's base | Diisopropylethylamine (Aldrich, Cat: 49, 621-9) |
| DMAC | Dimethylacetamide (Aldrich, Cat: 27, 055-5) |
| DMAP | Dimethylaminopyridine (Aldrich, Cat: 10, 770-0) |
| DMF | N,N-Dimethylformamide (Aldrich, Cat: 27, 054-70) |
| DMPA | Dimethoxyphenylacetophenone (Aldrich, Cat: 19, 611-8) |
| ETOH | Ethanol (Merck, Cat: 100983) |
| EtoAc | Ethyl Acetate (Aldrich, Cat: 49, 451-8) |
| N-hexane | N-Hexane (Merck, Cat: 152496G) |
| HxCl | Hexanoyl Chloride (Aldrich, Cat: 29, 465-9) |
| $H_2O_2$ | Hydrogen Peroxide (Riedel-de Haën Cat: 31642) |
| | Isocyanatopropyl Triethoxy Silane (Fluka, Cat: 58810) |
| | Magnesium Sulphate (Aldrich, Cat: 20, 809-4) |
| MbA | N,N-Methylenebisacrylamide (Aldrich, Cat: 14, 607-2) |
| MDI | Methylene bis(p-phenyl isocyanate) (Aldrich, Cat: 25, 643-9) |
| | Molecular Sieve (Riedel-de Haën Cat: 31812) |
| | PELLETHANE 2363-80A (Dow Chemicals) |
| 4-PCl | 4-Pentenoyl Chloride (Aldrich, Cat: 46, 847-9) |
| | Petroleum Ether (Aldrich, Cat: 32, 044-7) |
| | Pyridine (Aldrich, Cat: 27, 040-7) |
| | PURSIL 35 80A (A Silicone Polyether Urethane) (Polymer Technology Group, Berkeley, CA) Similar materials are also described on the Internet: <http://www.polymertech.com/materials/siliconeurethanes.hmtl> and may be prepared by the procedures generally described in U.S. Pat. No. 5,589,563. |
| Ringer's Solution | A solution of recently boiled distilled water containing 8.6 grams sodium chloride, 0.3 grams potassium chloride, and 0.33 grams Calcium Chloride per liter - the same concentrations as their occurrence in body fluids. Ingredients are: NaCl 6 grams, KCl 0.075 grams, $CaCl_2$ 0.1 grams, $NaHCO_3$ 0.1 grams. Sodium Chloride (Aldrich, Cat: 31, 016-6) |
| NaH | Sodium Hydride Free-flowing powder; moistened with oil Assay 55-65% (gas-volumetric) (Fluka, Cat: 71620) |
| $AgNO_3$ | Silver Nitrate (Aldrich, Cat: 20, 913-9) |
| THF | Tetrahydrofuran (Merck, Cat: AB009731) |
| TEA | Triethylamine (Aldrich, Cat: 54, 396-9) |
| TMPTMA | Trimethylolpropane Trimethylacrylate (Aldrich, Cat: 24, 684-0) |

Analytical Techniques

Thin Layer Chromatography (TLC)

Approximately 0.3-0.5 milliliter of sample was withdrawn from the reactor during reactions and quenched in saturated ammonium chloride, after which the product was extracted in ethyl acetate. Thin layer chromatography (TLC) was used to monitor the progress of the reaction. The TLC plates were spotted and allowed to run in a 15% ethyl acetate/petroleum ether mixture where after it was visualized with 254 nm ultra violet light.

Preparative Thin Layer Chromatography (PTLC)

No more than 100 milligrams of product was dissolved in a sparing volume of diethyl ether. A syringe and needle was used and the product was applied to the plate as a very thin line approximately 20 mm from the bottom of the plate.

A 5% mixture of ethyl acetate/petroleum ether was used as mobile phase. After the plate was allowed to run in the mobile phase, it was removed and carefully dried. This was repeated five times or until good separation was achieved.

The regions on the plate where the different fractions were observed, were carefully marked and scraped off the plate, whereafter it was extracted, with ethyl acetate, and vacuum dried.

Nuclear Magnetic Resonance Spectroscopy (NMR)

Approximately 40-60 milligrams of product was dissolved in deuterated chloroform. $^1$H and $^{13}$C NMR spectra of the sample were obtained from a Varian Unity 400 spectrometer at 400 and 100 MHz frequency respectively. Chemical shifts are reported as δ (ppm (i.e., parts per million))—values relative to tetramethylsilane (TMS) as internal reference.

High-Resolution Mass Spectroscopy (HRMS)

High-resolution mass spectroscopy was performed at the University of the Witwatersrand, South Africa, on a Micromass VG 70SEQ MS. A direct insertion probe with sample introduction was used with a positive polarity. Four scans/decade were used and the mass range was 3000 amu/8 kV.

Matrix-Assisted Laser Desorption/Ionization (MALDI)

Approximately 1-2 milligrams of product was diluted 1:100 with tetrahydrofuran. A saturated solution of 2,5-dihydroxybenzoic acid in deuterated water was used as matrix. One μl (microliter) of the matrix was applied to a MALDI P100 gold sample plate and 1 μl of sample added by mixing it with a micropipette. The spot was then allowed to completely dry under a gentle stream of air in order to crystallize the matrix and trap the sample in the crystals after crystal formation was confirmed by light microscopy, the plate was then inserted into a Perspective Biosystems Voyager DE-PRO Biospectrometry Workstation (which possesses delayed extraction technology) for analysis.

The sample was analyzed using the positive ion method, with an accelerating voltage of 20 kV, grid voltage of 94%, guide wire voltage of 0.05%, delayed extraction at 250 ns and laser intensity of 2600. Spectra were captured using Perspective Grams/32(R) v.4.14.

Chemical Modification of Thermoplastic Polymers

The accurate control of the modification of polymers with latent crosslinking groups, and thus control over the eventual crosslinking, is a consideration if the materials are intended for medical or biological applications.

Polyurethanes are large and complex molecules. The number average molecular weight ($M_n$) of PELLETHANE 2363-80AE, a well-known medical grade polyurethane (PU), is approximately 45,000 grams/mole. Most commercial thermoplastic polyurethanes include of a hard segment consisting out of methylene bis (p-phenyl isocyanate) (MDI) and 1,4-butane diol (BDO). PELLETHANE 2363-80AE, such an example, further has a soft segment consisting out of poly (tetramethylene oxide) glycol (PTMEG) ($M_n$=1000 grams/mole).

The size and complexity of the polyurethane molecules therefore makes it difficult to study modification reactions (involving small molecules or when low conversions are obtained) with standard analytical techniques (including nuclear magnetic resonance spectroscopy (NMR)), due to dynamic range problems.

The utilization of a smaller, less complicated molecule (model compound) enables more accurate investigation of the chemistry involved by enabling the monitoring of reactions using standard organic chemistry techniques (e.g., thin layer chromatography), as well as scaling up and quantitative analyses of the product using nuclear magnetic resonance (NMR), high resolution mass spectrometry (HRMS) and matrix-assisted laser desorption/ionization (MALDI).

Figure 6:
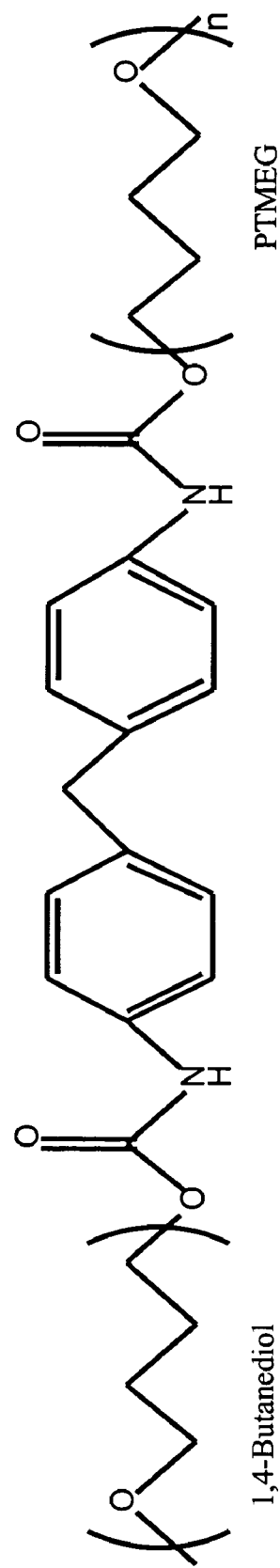
FIG. 6 is a representation of the hard segment of PELLETHANE 2363-80AE.
Figure 7:
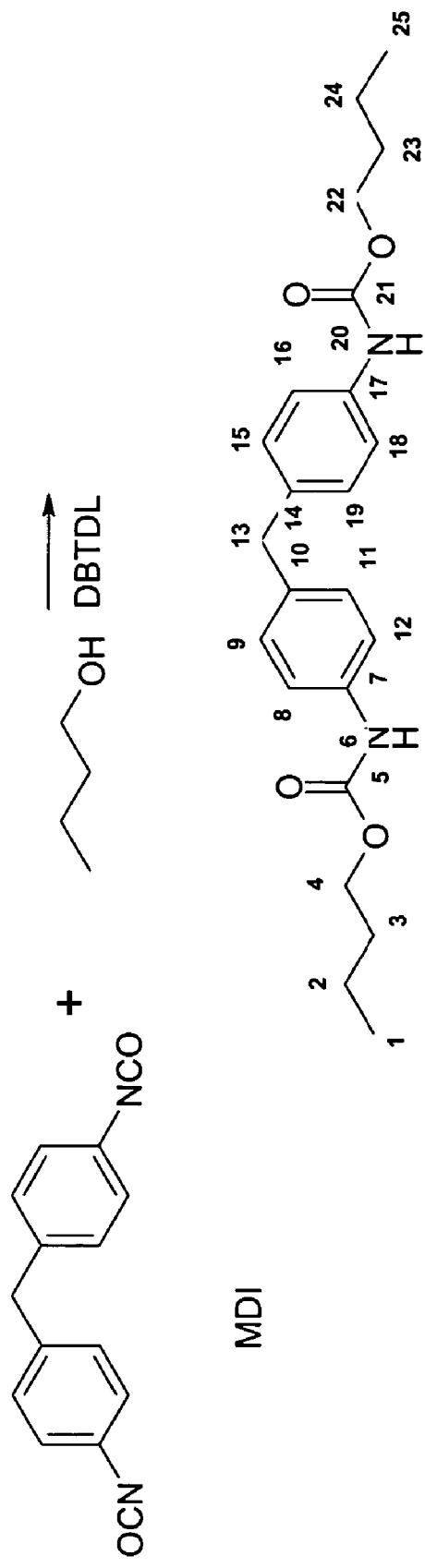
FIG. 7 is a representation of the synthesis of model urethane compound (Compound 1).

In order to avoid the complexities of macromolecules and the difficulties associated with their characterization, a model urethane compound 1 with similar structure to the repeating hard segment of PELLETHANE 2363-80AE (e.g., FIG. 6) was synthesized by the reaction between methylene bis (p-phenyl isocyanate) (MDI) and 1-butanol (BtOH) and then isolated, purified and characterized (e.g., FIG. 7).

The synthesized model urethane compound 1 was then used to study and evaluate the reaction with different candidate acyl chlorides. As the reaction may be achieved by either increasing the strength of the nucleophile (carbamate nitrogen), or by improving the electrophilicity of the modification agent (acyl chloride), both routes were investigated. The complicating factor, however, is the fact that the present invention may require the modification agent to also contain a second group that is unaffected by the modification reaction, but capable of crosslinking the modified material at a later stage (in this case, a vinyl or other unsaturated group).

These two aspects were separated such that optimized acylation conditions were initially identify using an acyl chloride with a long saturated aliphatic tail (e.g., hexanoyl chloride). Reactions were subsequently carried out with other acyl chlorides containing unsaturated groups capable of remaining stable during the N-acylation reaction in order to address the crosslinking aspect.

The urethane model compound 1 was successfully synthesized, purified and characterized by nuclear magnetic resonance (NMR) and high-resolution mass spectroscopy (HRMS). The results (signals of NMR spectra and returned mass) were found to be consistent with reported and theoretical values.

The reaction between the model urethane compound 1 and hexanoyl chloride was achieved by either nucleophilic or electrophilic enhancement; the former being the more effective method, with the stronger base (butyllithium) resulting in a significant higher yield. Separation of the product fractions was achieved using preparative thin layer chromatography. High-resolution mass spectroscopy returned the masses consistent with the mono- and di-acylated compounds, while the successful reaction site was shown (NMR) to be the intended carbamate nitrogen.

The success of the hexanoyl chloride coupling was repeated with 4-pentenoyl chloride, thereby introducing an -α,β-unsaturated C=C bond for crosslinking. Although the coupling may be achieved by either nucleophilic or electrophilic enhancement, the former (especially when butyllithium was used) was again the more effective method.

As a result of the model study, investigations were undertaken with medical grade thermoplastic polyurethanes and model compounds thereof.

Example 1

Synthesis of the Model Urethane Compound

The experimental formulation for the manufacturing of 50 grams (theoretical yield) of the model compound is summarized in Table 1. Fifty percent excess 1-butanol was used. A 1000 milliliters (ml) round bottom flask was supplied with a thermometer, inert gas (He) inlet, gas outlet, magnetic follower and a cooled condenser and a heating mantle.

TABLE 1

Formulation of Model Compound Synthesis

| Reactants | Mass (grams) |
|---|---|
| 1-Butanol (BtOH) | 27.96 |
| Tetrahydrofuran (THF) | 280.00 |
| Methylene bis (p-phenylisocyanate) (MDI) | 31.46 |
| Dibutyltin dilaurate (DBTDL) | 0.10 |

The reaction vessel was charged with the 1-butanol, and water was removed by azeotropic distillation (116° C.) of 6 grams of the initial 33.96 grams charge. The condenser was then removed and the Helium flow rate set at 3 liters per minute (l/min). After cooling to 40° C. and addition of 120 grams of tetrahydrofuran, the catalyst was added and the reactor re-heated to 50° C.

Pre-dissolved MDI (31.46 grams in 160 grams THF) was subsequently added to the vessel over 5-10 minutes (min) from a dripping funnel. After 5 hours (hrs) of reaction at 50° C., the heating source was switched off, the reaction mixture was allowed to cool to room temperature (RT, approximately 20° C.) and allowed to react for an additional 17 hours. The reaction was performed throughout under constant stirring and inert (He) atmosphere.

Excess solvent was removed by bubbling with Helium gas, and the concentrated product recovered by precipitation in 10-fold excess cold hexane (−10° C.). After drying (under vacuum, RT, 24 hours) the product was purified by redissolving in THF and precipitation in n-hexane before calculation of the yield.

Acylation of Model Urethane Compound

Reactions involving an array of different reagents and solvents were first performed on semi-micro scale (small scale) involving two reaction approaches and the reactions were qualitatively analyzed using thin layer chromatography (TLC). Selected reactions were scaled up and quantitatively analyzed by nuclear magnetic resonance spectroscopy (NMR), high-resolution mass spectroscopy (HRMS) and matrix assisted laser desorption/ionization (MALDI).

Example 2

Increasing the Nucleophilicity of the Carbamate Nitrogen

A 25 milliliter round bottom reaction vessel was supplied with a septum and inert gas supply. Reactions were carried out under anhydrous conditions using freshly distilled solvents under an inert atmosphere (Helium gas). Either sodium hydride or butyllithium was selected as base.

Sodium hydride and 2 milliliter of tetrahydrofuran (THF) were added to the reactor and cooled down to below 0° C., using a mixture of ice and ethanol. The model compound 1, which was pre-dissolved in 1 milliliter of THF, was then slowly added to the reactor over 5 minutes and the resulting mixture was left for 30 minutes to allow the formation of the anion.

When butyllithium was used, the pre-dissolved model compound 1 was first added to the reactor, whereafter the contents were cooled down below 0° C., followed by the addition of the butyllithium (drop-wise over 5 minutes)(see Table 2 for list of reactants and formulation used).

TABLE 2

Formulation for Acylation Reactions (Increase of Nucleophilicity)

| Components | Reactants | Quantity |
|---|---|---|
| 1. Strong base | 1.1 Sodium hydride (NaH) | 1.25 mmol |
| | 1.2 Butyllithium (BuLi) | " |
| 2. Solvent | 2.1 Tetrahydrofuran (THF) | 3.0 ml |
| | 2.2 N,N-dimethylformamide (DMF) | " |
| 3. Starting material | 3.1 Model compound (MC 1) | 0.5 mmol |
| 4. Acyl chloride | 4.1 Acryloyl chloride (AcCl) | 2.0 mmol |
| | 4.2 Hexanoyl chloride (HxCl) | " |
| | 4.3 4-Pentenoyl chloride (4-PCl) | " |

Four molar equivalents (two times excess) acyl chloride were added drop-wise over a period of 15-20 minutes using a syringe and the resulting mixture was left for 30 minutes at 0° C., whereafter the ice-bath was removed and the reaction mixture allowed to warm to room temperature (RT, approximately 20° C.). Reactions were monitored using TLC and stopped after 60 minutes.

Example 3

Increasing the Electrophilicity of the Acyl Chloride

A 25 milliliter round bottom reaction vessel was supplied with a septum and inert gas supply. Reactions were carried out under anhydrous conditions using freshly distilled solvents under an inert atmosphere (Helium gas).

The acyl transfer agent, acid acceptor and 2 milliliter of solvent were charged to the reactor. The model compound, which was pre-dissolved in 1 milliliter of solvent, was then added to the reactor over 5 minutes, and the resulting mixture was cooled down to below 0° C. using a bath containing a mixture of ice and ethanol.

Four molar equivalents (two times excess) acyl chloride were then added drop-wise over a period of 15-20 minutes using a syringe. The resulting mixture was left for 30 minutes at 0° C., whereafter the ice-bath was removed and the reaction mixture allowed to warm to room temperature (RT, approximately 20° C.). See Table 3 for a list of the reactants and the formulation used. Reactions were monitored using TLC and stopped after 24 hours.

TABLE 3

Formulation for Acylation Reactions (Increase of Electrophilicity)

| Components | Reactants | Quantity |
|---|---|---|
| 1. Acid acceptor | 1.1 Hunig's base | 2.0 mmol |
| | 1.2 Pyridine | " |

TABLE 3-continued

Formulation for Acylation Reactions (Increase of Electrophilicity)

| Components | Reactants | Quantity |
|---|---|---|
| 2. Acyl transfer agent | 2.1 Dimethylaminopyridine (DMAP) | 0.2 mmol |
| 3. Solvent | 3.1 Tetrahydrofuran (THF) | 3.0 ml |
|  | 3.2 Dichloromethane (DCM) | " |
| 4. Starting material | 4.1 Model compound (MC) | 0.5 mmol |
| 5. Acyl chloride | 5.1 Acryloyl chloride (AcCl) | 2.0 mmol |
|  | 5.2 Hexanoyl chloride (HxCl) | " |
|  | 5.3 4-Pentenoyl chloride (4-PCl) | " |

Example 4

Scale-up and Purification of Reaction

The selected reactions were scaled up (by a factor of 5) in order to produce sufficient product for separation into their product fractions using gravity columns and preparative TLC and subsequent characterization. The synthesis method, as described in Example 2 was used for the initial reactions, followed by the following additional steps.

The reaction product was washed after dilution in 150 milliliter of diethyl ether and transferring to a 250 milliliter separating funnel. The excess base was neutralized using 50 milliliter of saturated ammonium chloride and four washes (4×50 milliliter) were carried out using water to remove the majority of the unreacted reagents including the salt formed during the reaction with the free metal ion of the strong base. After an additional wash with a saturated sodium chloride solution, the product rich phase was transferred to a beaker, dehydrated with anhydrous magnesium sulphate, and filtered off.

The dried product was dissolved in a sparing volume of diethyl ether and carefully transferred to a gravity column pre-packed with Silica gel. A product to Silica gel ratio of approximately 1:50 was used with a 15% ethyl acetate/petroleum ether mixture as mobile phase to remove as much as possible of the remaining impurities. The product was recovered using a Büchi rotary-evaporator.

Example 5

Analysis of Examples 1-4

The reaction scheme for the manufacturing of the model urethane compound (compound 1) is presented in FIG. 7. A final yield of 93% (mass %) was calculated. The signals of the returned $^1$H and $^{13}$C NMR spectra were assigned and compared with the chemical structure of compound 1.

The $^1$H NMR data of compound 1 is as follows: (400 MHz, CDCl$_3$) $\delta_H$ 0.94 (6H, t, J=7.3 Hz, H-1, 25), 1.41 (4H, s, J=7.5 Hz, H-2, 24), 1.64 (4H, p, J=7.3 Hz, H-3, 23), 3.87 (2H, s, H-13), 4.15 (4H, t, J=6.6 Hz, H-4, 22), 6.62 (2H, s, H-6, 20), 7.09 (4H, d, J=8.5 Hz, H-9, 11, 15, 19), and 7.28 (2H, d, J=7.1 Hz, H-8, 12, 16, 18).

The $^{13}$C NMR data of compound 1 is as follows: (100 MHz, CDCl$_3$) $\delta_C$ 13.9 (C-1, 25), 19.3 (C-2, 24), 31.2 (C-3, 23), 40.7 (C-13), 65.3 (C-4, 22), 119.1 (C-8, 12, 16, 18), 129.6 (C-9, 11, 15, 19), 136.3, 136.4 (C-7, 10, 14, 17), and 154.0 (C-5, 21).

The characteristic signal at 6.62 ppm was assigned to hydrogen (N—H) of the carbamate group and the resonance at 3.87 ppm attributed to the methylene protons between two aryl rings (Ar$_2$CH$_2$) are sensitive signatures for monitoring structure changes within the model urethane compound.

The methylene protons (H-4, 22) were observed at 4.15 ppm (expected at 4.1-4.2 ppm) and the absence of the signal at 3.6 ppm indicates full conversion of 1-butanol.

The signals of the $^{13}$C spectrum were assigned and found to be consistent with the proposed product (compound 1). The distinctive signals of deuterated chloroform (CDCl$_3$) were observed at 77.3 ppm, the terminal methylene (C-1, 25) at 13.9 ppm, the carbonyl carbons (C-5, 21) at 154.0 ppm, while the characteristic methylene carbon signal (adjacent to an ester) (C-4, 22) was observed at 65.3 ppm.

The returned mass obtained from the HRMS (mass for compound 1, HRMS: 398.2232) was compared with the theoretically calculated mass (calculated for C$_{23}$H$_{30}$O$_4$N$_2$=398.2206) and found to compare well. The calculated error (6.6 ppm) was well below the instrument's allowable error (10 ppm).

The model urethane compound was successfully synthesized, purified and characterized. The returned mass (HRMS) and NMR spectra were found to be consistent with the structure of compound 1 and the latter was also found to be consistent with reported spectra (e.g., Q.-W. Lu, et al., J. Pol. Sci. Part A: Polym. Chem., 2002, 40, 2310-2328; W. C. Yang, et al., Polymer, 1986, 27, 1235-1240; Y. Camberlin, et al. J. Pol. Sci: Polym. Chem. Ed., 1982, 20, 383-392; Z. Qin, et al., Macromolecules, 1985, 18,553-557).

Figure 8:
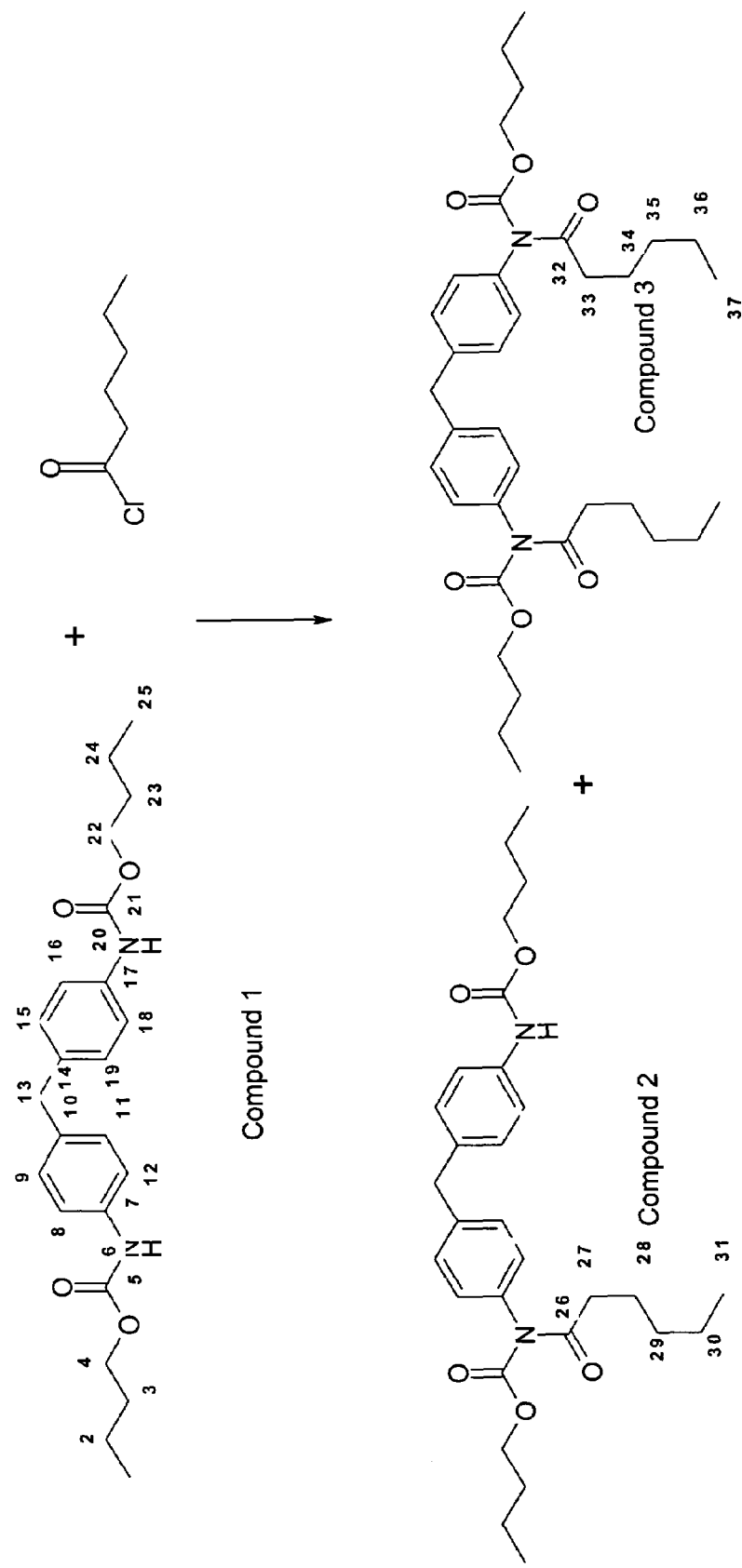
FIG. 8 is a representation of acylation of Compound 1 with hexanoyl chloride.

The first approach investigated was to try and increase the electrophilicity of the hexanoyl chloride using different acyl transfer agents (e.g., DMAP) and acid acceptors (e.g., Hünig's base) (e.g., FIG. 8). Extensive trials were performed and the best results (monitored with TLC) obtained when Hünig's base was used with catalytic amounts (10%) of DMAP in DCM or THF. Thin layer chromatography revealed two spots, the starting material (compound 1) and a second, very faint, less polar spot. This was believed to be the monoacylated urethane compound (compound 2) (confirmed later, see below).

Reactions were then carried out at different reaction times and temperatures in an attempt to increase the conversion. It, however, had a minor influence when monitored with TLC and the best results were obtained when the reaction temperature was moderately increased (55° C.), after the addition of hexanoyl chloride and maintained for 24 hours.

In the alternative approach, attention was focused on enhancing nucleophilicity of the donor by using the carbamate anion. This was achieved by either using sodium hydride or butyllithium. TLC revealed the formation of three spots, the starting material (compound 1) (faint spot) and two distinctive less polar, spots. This observation led to the scale-up of the reaction.

It was found possible to separate and isolate the product fractions by using preparative TLC plates. The two new less polar fractions assigned as compound 2 and compound 3 in order of decreasing polarity, respectively (each as single spots on TLC) were submitted for $^1$H and $^{13}$C NMR analyses and high-resolution mass spectroscopy (HRMS). The returned spectra were found to be identical, irrespective whether the reactions were carried out with sodium hydride or butyllithium. The $^1$H and $^{13}$C NMR spectra, as well as the HRMS of the isolated fractions are presented below for the reactions carried out with butyllithium.

The $^1$H NMR data of compound 2 is as follows: (400 MHz, CDCl$_3$) $\delta_H$ 0.78-0.99 (9H, m, H-1, 25, 31), 1.10-1.74 (14H, m, H-2, 3, 23, 24, 28, 29, 30), 2.92 (2H, t, J=7.4 Hz, H-27), 3.95 (2H, s, H-13), 4.10 (2H, t, J=6.6 Hz, H-22), 4.16 (2H, t, J=6.6 Hz, H-4), 6.60 (1H, s, H-20), 6.98 (2H, d, J=8.4 Hz, H-15, 19), 7.11 (2H, d, J=8.3 Hz, H-9, 11), 7.18 (2H, d, J=8.3 Hz, H-8, 12), and 7.29 (2H, d, J=8.4 Hz, H-16, 18).

The $^{13}$C NMR data of compound 2 is as follows: (100 MHz, CDCl$_3$) $\delta_C$ 13.5, 13.7, 13.9 (C-1, 25, 31), 18.9, 19.1, 22.5, 24.4, 30.4, 30.9, 31.3 and 33.8 (C-2, 3, 23, 24, 27, 28, 29, 30), 40.8 (C-13), 65.1, 66.7 (C-4, 22), 128.2-141.0 (C-7, 8, 9, 10, 11, 12, 14, 15, 16, 17, 18, 19), 154.2 (C-5, 21), and 176.0 (C-26).

The $^1$H NMR data of compound 3 is as follows: (400 MHz, CDCl$_3$) $\delta_H$ 0.82, 0.90 (12H, t, J=7.3 Hz, H-1, 25, 31, 37), 1.13-1.73 (20H, m, H-2, 3, 23, 24, 28, 29, 30, 34, 35, 36), 2.94 (4H, t, J=7.5 Hz, H-27, 33), 4.03 (2H, s, H-13), 4.11 (4H, t, J=6.6 Hz, H-4, 22), 7.00 (4H, d, J=8.4 Hz, H-9, 11, 15, 19), and 7.20 (4H, d, J=8.4 Hz, H-8, 12, 16, 18).

The $^{13}$C NMR data of compound 3 is as follows: (100 MHz, CDCl$_3$) $\delta_C$ 13.5, 13.9 (C-1, 25, 31, 37), 18.9, 22.5, 24.6, 30.4, 31.4 and 37.9 (C-2, 3, 23, 24, 27, 28, 29, 30, 33, 34, 35, 36), 41.0 (C-13), 66.7 (C-4, 22), 128.3 (C-8, 12, 16, 18), 129.7 (C-9, 11, 15, 19), 136.6, 140.4 (C-7, 10, 14, 17), 154.2 (C-5, 21), and 176.0 (C-26, 32).

The following observations were made regarding the $^1$H NMR spectra of the first less polar fraction assigned as compound 2. The protons of the carbamate nitrogen integrated for half of the protons, when compared to compound 1 signifying that mono-acylation had taken place. The introduction of one hexanoyl group was corroborated by high field aliphatic signals as well as downfield (2.92 ppm) triplets for the protons adjacent to the new carbonyl group (assigned as H-27) integrating for two protons. The dissimilarity observed for the chemical shift pattern of the aromatic ring protons at $\delta_H$=6.98-7.29 (H-9, 11; H-15, 19 and H-8, 12; H-16, 18) could serve as further evidence that di-symmetrization had taken place.

A shift in the signal, corresponding to the methylene protons (Ar$_2$CH$_2$) of compound 2, from $\delta_H$=3.87 ppm (compound 1) to $\delta_H$=3.95 ppm, was observed when compared to compound 1. This corresponds to an expected shift downfield due to the stronger electron-withdrawing effect imparted by the latent mono-acylated group.

The signals of the $^{13}$C spectrum were assigned and found to be consistent with the proposed product (compound 2). The correct number of aliphatic carbons and ether carbon signals (C-4, 22) were found present. The presence of a third carbonyl signal (assigned as C-26) resulting from the introduction of the hexanoyl group was also observed. The electronic environment of the two respective aromatic rings are different as is evident from the observed signals at 128.2-129.6 ppm (when compared to compound 1) and could serve as evidence that the returned NMR spectra are indeed that of the, dissymmetrical, mono-acylated model urethane compound (compound 2). Minimal impurities (trace amounts of compound 1) were found present and are due to imperfect purification.

The returned mass obtained from the HRMS (mass for compound 2, HRMS: 496.2914) was again within the allowable error range (error less than 4.7 ppm) when compared with the theoretically calculated mass (calculated for C$_{29}$H$_{40}$O$_5$N$_2$=496.2937).

In the $^1$H NMR spectrum of the second least polar fraction (compound 3), the protons of the carbamate nitrogen were completely absent, indicating full substitution of both N-atoms as a results of diacylation. In accordance with this was the similarity of the ring-protons $\delta_H$=7.00 (H-9, 11, 15, and 19) and $\delta_H$=7.20 (H-8, 12, 16, and 18)) due to restoration of symmetry, that is, both aromatic rings are now equivalent.

The observed shift downfield in the signal, corresponding to the methylene protons (H-13) of compound 3 to $\delta_H$=4.03 ppm compared to that for compound 1 ($\delta_H$=3.87 ppm) due to the even stronger electron-withdrawing effect imparted by the two acylated carbonate functionalities, was further evidence for diacylation.

The signals of the $^{13}$C spectrum of compound 3 were assigned and the signals observed at 13.9 ppm and 176.0 ppm can be attributed to the terminal methylene (C-31, 37) and the carbonyl carbons (C-26, 32), respectively of the acylated carbonate functionality.

High-resolution mass spectroscopy returned the exact mass for compound 3 (HRMS: 594.3669) when compared to the theoretically calculated mass (C$_{35}$H$_{50}$O$_6$N$_2$=594.3669).

The yields (mole %) for each individual fraction was calculated, for the reactions carried out with sodium hydride and butyllithium, and are presented in Table 4. The overall yield (X) was found to be 25.8% higher when butyllithium was used instead of sodium hydride.

The use of sodium hydride (solid) resulted in a heterogeneous reaction mixture, which might not have been as effective when compared with butyllithium (miscible liquid). Butyllithium is also a stronger base than sodium hydride.

TABLE 4

| | Calculated Yield | |
| --- | --- | --- |
| Compound | NaH | BuLi |
| $X_{compound2}$ | 36.5% | 24.6% |
| $X_{compound3}$ | 35.0% | 66.8% |
| $X_{total}$ | 53.3% | 79.1% |

The reaction between the model urethane compound (compound 1) and hexanoyl chloride was shown to be successful. Full conversion (although not a primary objective of this study) was however not achieved, even when a strong base like butyllithium was used. This phenomenon could be attributed to side reactions of hexanoyl chloride. A number of acyl chlorides were then used in trials to find one that contains a vinyl group that is unaffected during the modification reaction, but capable of crosslinking the modified material at a later stage.

It was decided to study the reaction of 4-pentenoyl chloride with the model urethane compound (compound 1).

As before, initially acylation under acyl-transfer conditions was first studied involving electrophilicity enhancement of the acyl chloride and reacting with the neutral carbamate. The best results (monitored with TLC) were obtained when Hünig's base was used with catalytic amounts (10%) of DMAP in THF. TLC revealed two spots, the starting material (compound 1) and one new, very faint, less polar spot. The spot was believed to be the monoacylated (compound 4) urethane compound (later confirmed, see below).

Several attempts were then made to try and increase the conversion by increasing the reaction temperature and time of reaction, but TLC showed little or no improvement. The best results (TLC) were obtained at room temperature and a 24 hour reaction time.

Attention was then directed at nucleophilicity enhancement using the carbamate anion (using either sodium hydride or butyl lithium). Promising TLC results were obtained revealing the formation of three spots, the starting material (compound 1) (faint spot) and two distinctive less polar, spots (assigned as compound 4 and 5 respectively). These reactions were then scaled up to produce suitable quantities of product.

Numerous attempts were then made to separate the scaled-up reaction product into its respective fractions using a gravity column packed with silica-gel. It was, however, not found possible to obtain pure reaction fractions either by reduction of the polarity of the mobile phase (ethyl acetate/petroleum ether) or by increasing the silica to product ratio.

Figure 9:
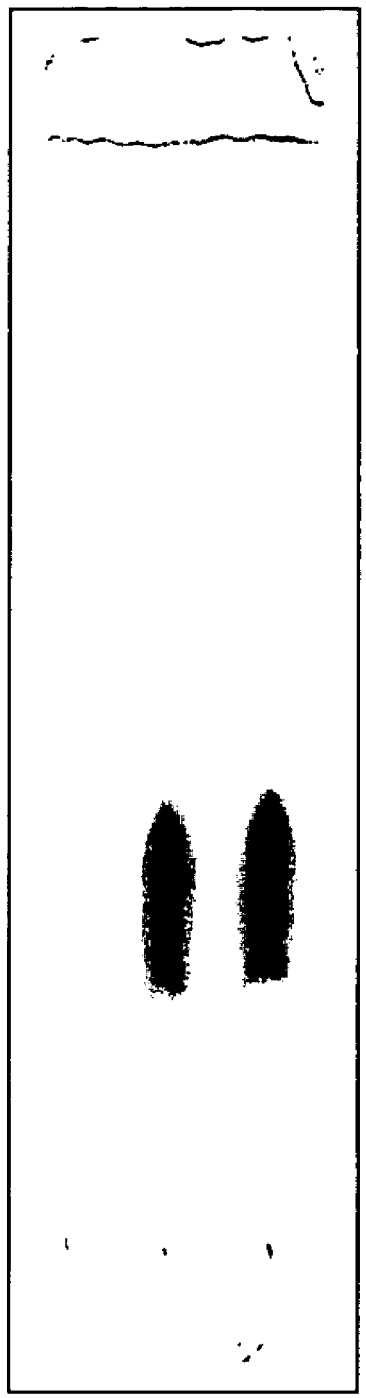
FIG. 9 is a representation of TLC plate of a mixture of Compounds 1, 4, and 5.

The small difference in polarity between the three fractions, as is evident from the TLC plate also prevented successful separation by PTLC (e.g., FIG. 9). The purified (but unfractionated) reaction product was analyzed by NMR and HRMS analyses.

Although it was not possible to assign all of the individual signals of the returned $^1$H and $^{13}$C NMR spectra sufficient assignment could be made to enable elucidation of the reaction.

The introduction of 4-pentenoyl chloride resulted in the appearance of characteristic signals between 4.95-5.13 ppm and 5.76-5.95 ppm in the $^1$H NMR spectrum attributed to the vinyl protons (H-30, 35) and (H 29, 34), respectively. The latent acylated group further resulted in the appearance of high field aliphatic signals and a multiple of signals downfield (2.35-2.50 ppm) corresponding to the protons adjacent to the new carbonyl group (assigned H-27 and H-32), integrating for 4 protons. The three singlets proton signals of the methylene protons ($Ar_2CH_2$) corresponding to compounds 1, 4 and 5, respectively were observed at 3.88, 3.95 and 4.03 ppm.

The presence of the terminal vinyl carbon signals (C-30, 35) assigned at 115.8 ppm in the $^{13}$C spectrum can serve as further evidence of successful acylation. The presence of the carbonyl signals (assigned as C-26, 31) resulting from the introduction of the 4-pentenoyl chloride group was also observed.

The methylene proton signals, attributed to compounds 1, 4 and 5 were integrated for the respective reactions carried out with sodium hydride and butyllithium and used to calculate the following yields (Table 5).

TABLE 5

Calculated Conversions

| Compound | NaH | BuLi |
|---|---|---|
| $X_{compound4}$ | 49.1% | 39.1% |
| $X_{compound5}$ | 24.3% | 43.5% |
| $X_{total}$ | 51.5% | 63.1% |

The overall yield was found to be 11.6% higher when butyllithium was used instead of sodium hydride. This is consistent with the results obtained with hexanoyl chloride and can be ascribed to the relative strength of butyllithium and the homogeneous nature of the reaction mixture.

High-resolution mass spectroscopy returned the correct masses for the individual fractions in the mixed sample when compared to the theoretically calculated masses as summarized in Table 6.

TABLE 6

Summary of the Molecular Masses obtained from HRMS

| Components | Compound 1 | Compound 4 | Compound 5 |
|---|---|---|---|
| Mass from HRMS (g/mole) | 398.2223 | 480.2653 | 562.3057 |
| Molecular formula | $C_{23}.H_{30}.O_4.N_2$ | $C_{28}.H_{36}.O_5.N_2$ | $C_{33}.H_{42}.O_6.N_2$ |
| Calculated mass (g/mole) | 398.2206 | 480.2624 | 562.3043 |
| Error (ppm) | 4.5 | 5.9 | 2.5 |

The MALDI spectrum was obtained. Although this method is not generally suited for molecules with such low molecular masses as the ones under investigation, useful results were obtained by optimization of the assay conditions as described above.

Compounds 1, 4, and 5 were observed at molecular masses of (421.685, 437.78), (503.705, 519.86), (585.738, 601.392) corresponding to the Na- and K-adducts (inherent to the method used).

TABLE 7

Summary of the Molecular Masses obtained from MALDI analysis

| Components | Compound 1 | Compound 4 | Compound 5 |
|---|---|---|---|
| Na-adduct (g/mole) | 398.695 | 480.715 | 562.738 |
| K-adduct (g/mole) | 398.682 | 480.762 | 562.834 |
| Molecular formula | $C_{23}.H_{30}.O_4.N_2$ | $C_{28}.H_{36}.O_5.N_2$ | $C_{33}.H_{42}.O_6.N_2$ |
| Calculated mass (g/mole) | 398.221 | 480.262 | 562.304 |

The molecular masses of Na and K were deducted and the results are presented in Table 7. Although not as accurate as the results obtained with HRMS, the results are useful. The signals at molecular masses of 273.373, 365.355, and 397.586 are distinctive of the matrix used.

Example 6

Acrylation of PELLETHANE with Acryloyl Chloride

A polyurethane solution containing 12 grams of PELLETHANE 2363 80AE and 194 grams each of tetrahydrofuran (THF) and dimethylacetamide (DMAC) was placed in a three-necked reaction vessel supplied with a gas inlet, 2 dripping funnels and a cooling jacket. The dropping funnels were respectively charged with 6.7 grams triethylamine (TEA) in 128 grams THF/DMAC (50/50) and 4.0 grams acryloyl chloride (AcCl) in THF/DMAC (50/50). After initiating the bubbling of an inert gas (Argon; 1 to 2 milliliter/minute) through the polymer solution, the contents of the dripping funnels were slowly added to the polymer solution over a period of 1.5 hours, after which the reaction was allowed to continue for an additional 20 hours. In addition to maintaining an inert atmosphere in the reaction vessel, its contents was shielded from light, stirred (200 rpm (i.e., revolutions per minute)), and maintained at approximately 22 Celsius.

Example 7

Acrylated PELLETHANE Isolation and Purification

The reaction mixture prepared according to methods described in Example 6 was slowly (over a period of 10 minutes) poured into a container containing 800 milliliter of vigorously stirred Ethanol (EtOH) at room temperature to effect the precipitation of the modified polymer. After decantation of the major part of the solvent, remaining solvents were removed from the polymer by vacuum drying for 24 hours in the dark at room temperature. The dried polymer was re-dissolved in 90 grams of THF and re-precipitated in 2000 milliliter of Ethanol. Subsequent removal of solvents by decantation and vacuum drying produced a yield of 9.5 grams of acrylated PELLETHANE product.

Example 8

Crosslinking of Acrylated PELLETHANE

To 85 grams of cyclohexanone, 9.5 grams of acrylated PELLETHANE (as prepared in Example 7) and 0.25 parts per hundred resin (phr) dimethoxyphenylacetophenone were added. After dissolution of the polymer, solid films were cast from the solution by standard solvent casting and evaporation techniques. The dried films (0.5 mm thick) were subsequently exposed to ultraviolet irradiation (315-400 nm) for 10 minutes to effect the crosslinking.

Example 9

Analysis

Figure 10:
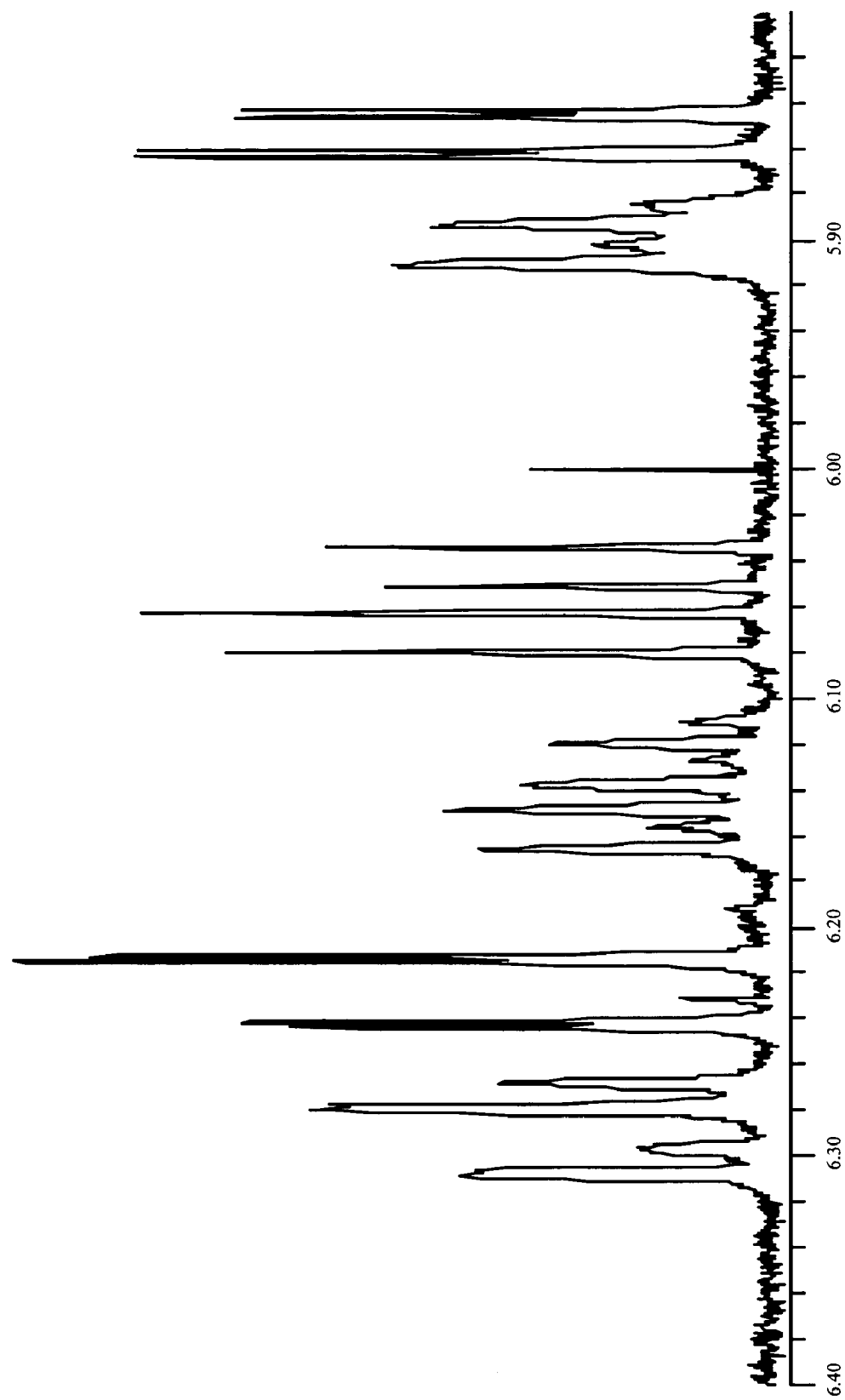
FIG. 10 is a representation of a portion of the proton NMR spectrum of the acrylated PELLETHANE sample showing the characteristic pattern associated with the pendant acrylate group.
Figure 11:
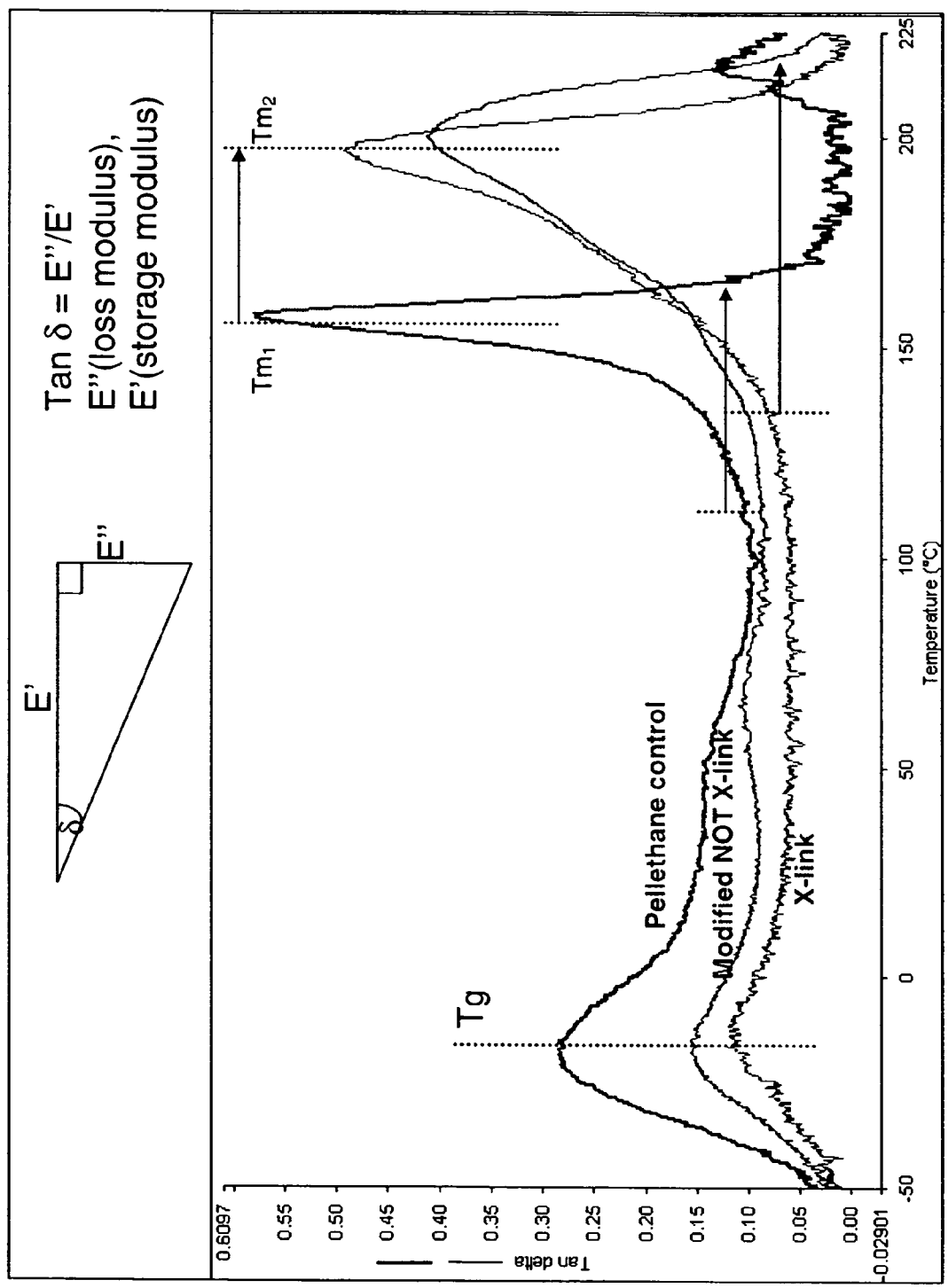
FIG. 11 is a representation of the tan δ spectra of the control PELLETHANE sample, the acrylated PELLETHANE sample, and the crosslinked acrylated sample.
Figure 12:
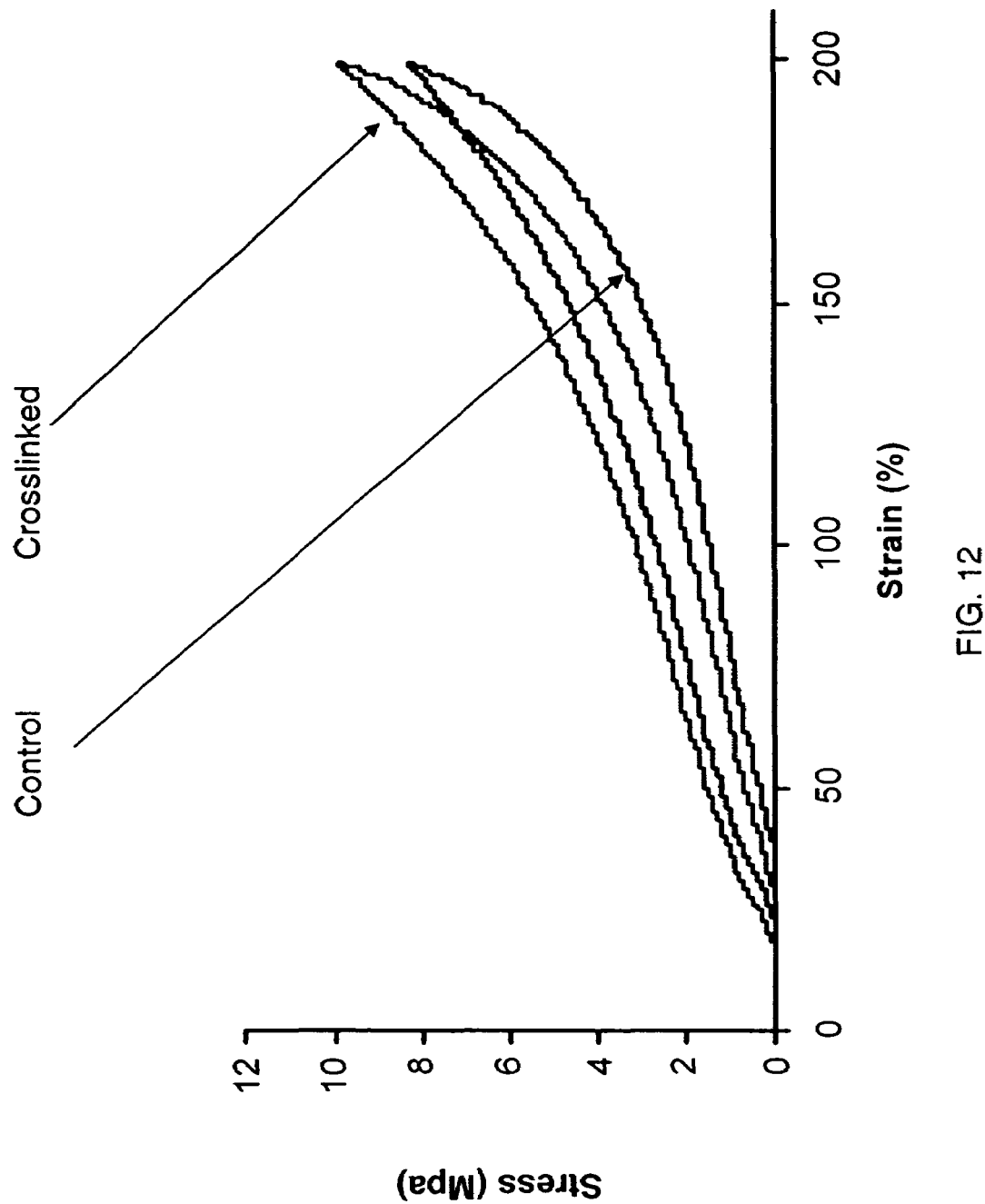
FIG. 12 a representation of the stress-strain characteristics of the PELLETHANE sample after modification with acryloyl chloride and an unmodified, uncrosslinked PELLETHANE sample.

Films as prepared in Example 8 were characterized by Nuclear Magnetic Resonance (NMR) spectroscopy, Dynamic Mechanical Analysis (DMA) and tensile testing. Films of unmodified samples (with inclusion of DMPA and UV exposure) were used as controls. The proton NMR spectrum showed peaks between 5.8 and 6.4 ppm consistent with the splitting pattern expected from acrylate groups, absent in the control sample (e.g., FIG. 10). Dynamical mechanical analysis showed a tan δ at approximately 160 degrees Celsius (corresponding to the melt temperature of the polymer hard segment) (e.g., FIG. 11). This peak was shifted to a significantly higher temperature (approximately 200 degrees Celsius) for the crosslinked sample. A third sample, modified and cast into a film, but not crosslinked before analysis, was also analyzed. The similar increase in melting temperature for this sample (when compared to the unmodified control) shows that the heat encountered during analysis was also capable of initiating the crosslinking reaction. Tensile tests revealed improved recovery, lower plastic deformation and decreased hysteresis for the crosslinked samples (when compared to the controls) (e.g., FIG. 12).

Example 10

Evaluation of Chemical Stability

Dumbbell samples were cut (ASTM D638) (n=3) from films as prepared in Example 8 and from films of unmodified samples (served as controls), weighed and placed into 30 milliliter glass tubes. The test tubes were filled with 4 different solutions (0.1 Molar Silver nitrate ($AgNO_3$), 20% hydrogen peroxide ($H_2O_2$), Ringer's solution, and water) and placed in constant temperature laboratory ovens (the one group at 37° C. and the other group at 90° C.) and left for 21 days. All the samples were subsequently thoroughly washed, dried in a vacuum oven (room temperature, for 4 days) and weighed to determine their mass retention after which tensile testing was performed.

TABLE 8

Chemical Stability Results

| Treatment | Temp. (°C.) | Exp. Num. | Sample | Mass retention (%) | p-value | Tensile strength at break (Mpa) | p-value | Tensile strain at break (%) | p-value |
|---|---|---|---|---|---|---|---|---|---|
| $AgNO_3$ | 37° C. | 5_1 | Control | 95.20 | 0.11 | 41.64 | 0.01 | 650.15 | 0.03 |
| | | 5_2 | Crosslinked | 94.81 | | 55.41 | | 719.43 | |
| | 90° C. | 5_3 | Control | 95.36 | 0.06 | 2.78 | 0.40 | 33.12 | 0.50 |
| | | 5_4 | Crosslinked | 96.09 | | 2.65 | | 33.12 | |
| $H_2O_2$ | 37° C. | 5_5 | Control | 94.02 | 0.03 | 31.62 | 0.01 | 602.64 | 0.27 |
| | | 5_6 | Crosslinked | 94.35 | | 47.56 | | 549.10 | |
| | 90° C. | 5_7 | Control | 92.10 | 0.28 | 0 | — | 0 | — |
| | | 5_8 | Crosslinked | 91.88 | | 0 | | 0 | |
| Ringer's solution | 37° C. | 5_9 | Control | 94.65 | 0.50 | 46.75 | 0.38 | 727.49 | 0.13 |
| | | 5_10 | Crosslinked | 94.64 | | 49.43 | | 585.87 | |
| | 90° C. | 5_11 | Control | 94.54 | 0.02 | 9.07 | 0.03 | 263.01 | 0.06 |
| | | 5_12 | Crosslinked | 95.26 | | 18.17 | | 434.32 | |
| Water | 37° C. | 5_13 | Control | 94.71 | 0.05 | 47.76 | 0.12 | 706.32 | 0.11 |
| | | 5_14 | Crosslinked | 95.1 | | 52.63 | | 644.44 | |
| | 90° C. | 5_15 | Control | 94.09 | 0.02 | 21.72 | 0.48 | 454.13 | 0.39 |
| Treatment | Temp. (°C.) | Exp. Num. | Sample | Mass retention (%) | p-value | Tensile strength at break (Mpa) | p-value | Tensile strain at break (%) | p-value |
| Water | 90° C. | 5_16 | Crosslinked | 95.40 | 0.02 | 21.43 | 0.48 | 499.38 | 0.39 |

The retained mass of the crosslinked material was found to be significantly higher in 4 cases when compared to the PELLETHANE controls. Tensile tests revealed significantly higher stress and strain at break for the crosslinked samples (when compared to the controls) in 3 and 2 cases respectively.

Example 11

Modification of PELLETHANE with 4-Pentenoyl Chloride

A polyurethane solution containing 25 grams of PELLETHANE 2363 80AE and 550 grams of dimethylformamide (DMF) was placed in a three-necked reaction vessel supplied with septum, inert gas inlet and a cooling jacket. After initiating the bubbling of an inert gas (Argon; 1 to 2 milliliter/minute) through the polymer solution, the contents of the reactor was cooled down to below 0° C. A slurry, consisting out of 0.3 grams sodium hydride (or butyllithium) and 10 grams DMF was then added to the reactor over a period of 10 minutes and the resulting mixture was left for 60 minutes. Fifty percent molar excess 4-pentenoyl chloride were added drop-wise over a period of 15-20 minutes using a syringe. The reaction was stopped after 60 minutes. In addition to maintaining an inert atmosphere in the reaction vessel, its contents was shielded from light and stirred (300 rpm).

Example 12

Modified PELLETHANE Isolation and Purification

The reaction mixture prepared according to methods described in Example 11 was slowly (over a period of 10 minutes) poured into a container containing 1600 milliliter of vigorously stirred water at room temperature to effect the precipitation of the modified polymer. After decantation of the major part of the solvent, remaining solvents were removed from the polymer by vacuum drying for 24 hours in the dark at room temperature. The dried polymer was re-dissolved in 180 grams of THF and re-precipitated in 2000 milliliters of Ethanol. Subsequent removal of solvents by decantation and vacuum drying produced a yield of 20.8 grams of modified PELLETHANE product.

Example 13

Crosslinking of Modified PELLETHANE

To a 10% solution (w/w) of tetrahydrofuran and modified PELLETHANE (as described in Example 12) different initiators (DCP and DMPA) and crosslinking monomers (BA, MbA and TMPTMA) were added respectively. Solid films were cast from the solution by standard solvent casting and evaporation techniques (as described in Examples 8 and 12). The dried films (0.5 mm thick) were subsequently exposed to either ultraviolet irradiation (315-400 nm) for 20 minutes (see subsequent samples 8_1-8_11 below) or to a heat source at a temperature of 120 or 160° C. for 6 hours (see subsequent samples 8_12-8_25 below), to effect the crosslinking. The crosslinked films were vacuum dried for 18 hours at room temperature. The crosslink density was determined by measuring the swollen volume of the crosslinked polymer, using the swelling index (Q). The weight of the dried film was measured in air and as a float in n-hexane after which the films were allowed to swell in dimethylformamide (DMF) (for at least 18 hours) and then weighed in air and as a float in n-hexane and the swelling index (Q), which is defined as the volume of solvent per volume of polymer, calculated.

TABLE 9

Swelling Results

| Exp | Modification Agent | Initiator | [Initiator] phr | Monomer | [Monomer] phr | Method of Initiation | Initiation Details | Swelling Index, Q |
|---|---|---|---|---|---|---|---|---|
| 8_1 | AcCl | DMPA | 1.5 | — | — | UV | 20 min | 3.57 |
| 8_2 | 4-PCl | DMPA | 1.5 | — | 0.0 | UV | 20 min | 7.62 |
| 8_3 | 4-PCl | DMPA | 1.5 | MbA | 0.5 | UV | 20 min | 3.53 |
| 8_4 | 4-PCl | DMPA | 1.5 | MbA | 1.0 | UV | 20 min | 3.49 |
| 8_5 | 4-PCl | DMPA | 1.5 | MbA | 1.5 | UV | 20 min | 3.33 |
| 8_6 | 4-PCl | DMPA | 1.5 | MbA | 2.0 | UV | 20 min | 3.42 |
| 8_7 | 4-PCl | DMPA | 0.5 | MbA | 1.5 | UV | 20 min | 4.04 |
| 8_8 | 4-PCl | DMPA | 1.0 | MbA | 1.5 | UV | 20 min | 3.41 |
| 8_9 | 4-PCl | DMPA | 1.5 | MbA | 1.5 | UV | 20 min | 3.33 |
| 8_10 | 4-PCl | DMPA | 2.0 | MbA | 1.5 | UV | 20 min | 3.14 |
| 8_11 | 4-PCl | DMPA | 1.5 | TMPTMA | 1.5 | UV | 20 min | 4.42 |
| 8_12 | 4-PCl | DCP | 1.5 | — | 0 | Heat | 160° C., 6 hours | 5.75 |
| 8_13 | 4-PCl | DCP | 1.5 | — | 0 | Heat | 120° C., 6 hours | 6.73 |
| 8_14 | 4-PCl | DCP | 1.5 | MbA | 0.5 | Heat | 120° C., 6 hours | 6.03 |
| 8_15 | 4-PCl | DCP | 1.5 | MbA | 1.0 | Heat | 120° C., 6 hours | 4.50 |
| 8_19 | 4-PCl | DCP | 1.5 | MbA | 1.5 | Heat | 120° C., 6 hours | 2.81 |
| 8_16 | 4-PCl | DCP | 1.5 | MbA | 2.0 | Heat | 120° C., 6 hours | 3.53 |
| 8_17 | 4-PCl | DCP | 0.5 | MbA | 1.5 | Heat | 120° C., 6 hours | 9.52 |
| 8_18 | 4-PCl | DCP | 1.0 | MbA | 1.5 | Heat | 120° C., 6 hours | 5.28 |
| 8_19 | 4-PCl | DCP | 1.5 | MbA | 1.5 | Heat | 120° C., 6 hours | 2.81 |
| 8_20 | 4-PCl | DCP | 2.0 | MbA | 1.5 | Heat | 120° C., 6 hours | 3.46 |
| 8_21 | 4-PCl | DCP | 1.5 | BA | 1.5 | Heat | 120° C., 6 hours | 4.13 |
| 8_22 | 4-PCl | DCP | 1.5 | TMPTMA | 0.65 | Heat | 120° C., 6 hours | 3.83 |
| 8_23 | 4-PCl | DCP | 1.5 | TMPTMA | 1.3 | Heat | 120° C., 6 hours | 3.36 |
| 8_24 | 4-PCl | DCP | 1.5 | TMPTMA | 1.5 | Heat | 120° C., 6 hours | 3.23 |
| 8_25 | 4-PCl | DCP | 1.5 | TMPTMA | 1.6 | Heat | 120° C., 6 hours | 3.41 |

The modified material was successfully crosslinked using either UV or a heat source as means of initiation and the swelling index calculated. The use of monomers (e.g., BA, MbA, and TMPTMA) resulted in a reduction in swelling and hence an increase in crosslinking density. The lowest swelling index (highest crosslinking density) was obtained (Example 8_19) when 1.5 parts per hundred resin DCP and 1.5 parts per hundred resin MbA was used to crosslink a polyurethane material (that was modified with 4-pentenoyl chloride) at 120° C.

Example 14

Analyses

Figure 13:
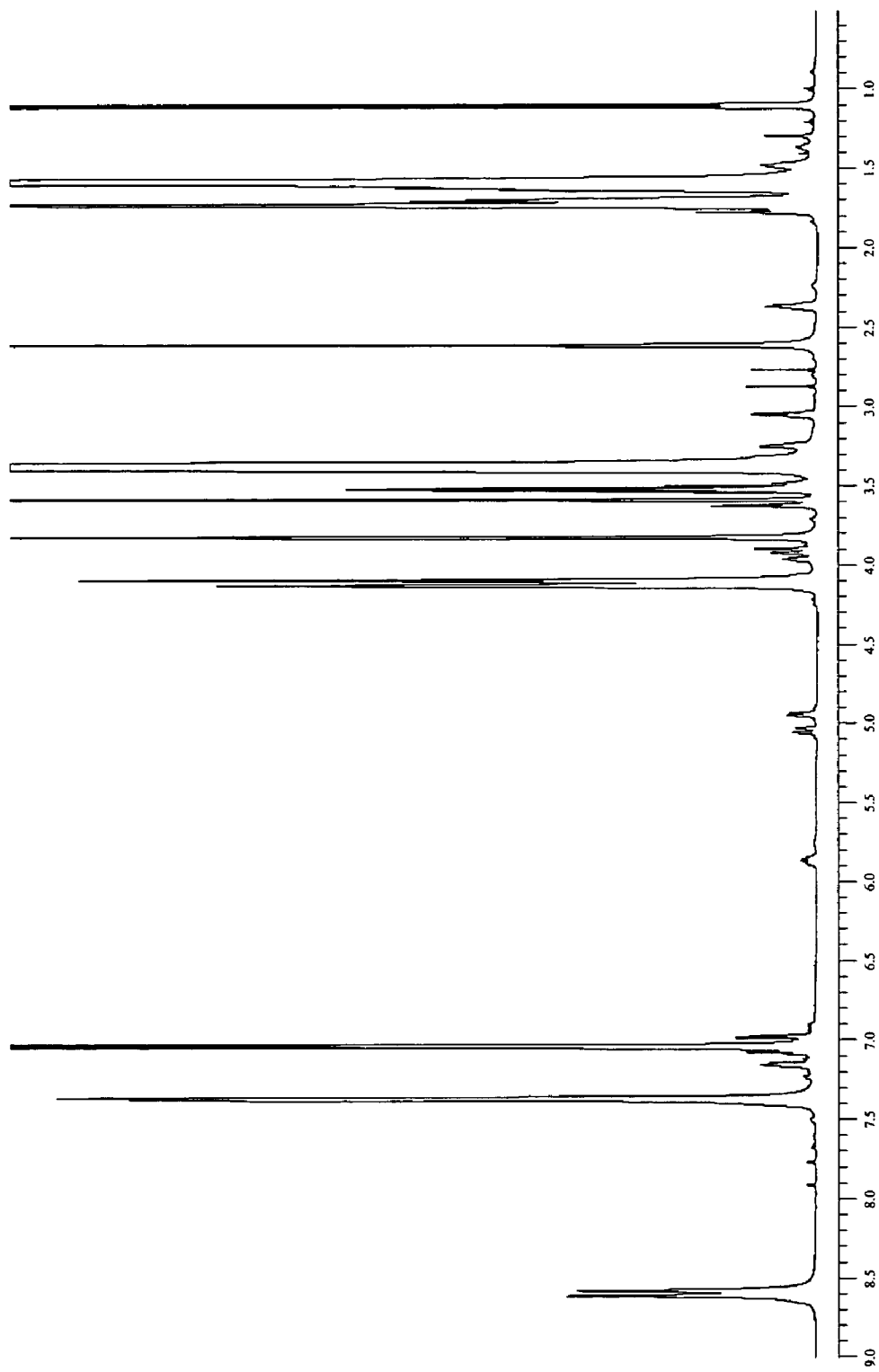
FIG. 13 is a representation of the proton NMR spectrum of the modified PELLETHANE with 4-pentenoyl chloride (7.5% modification).
Figure 14:
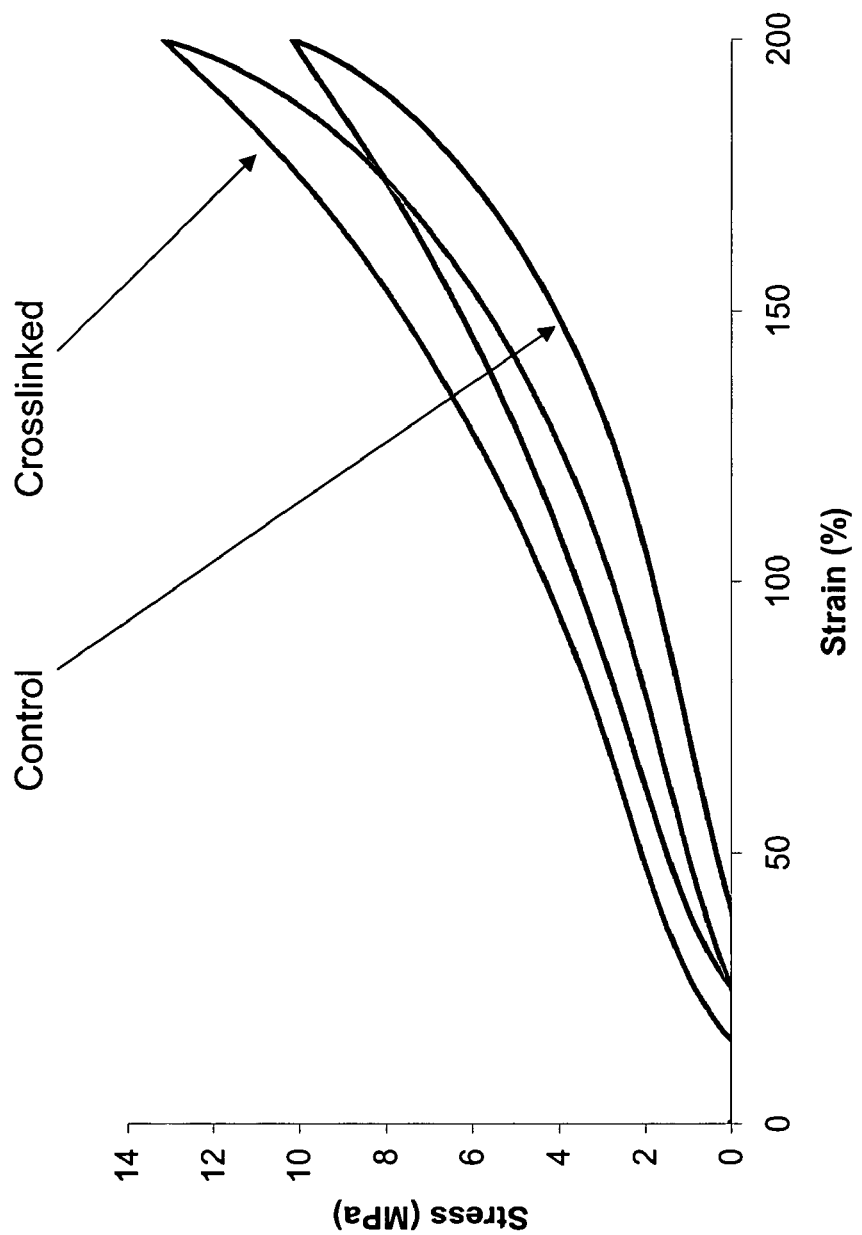
FIG. 14 is a representation of the stress-strain characteristics of the PELLETHANE sample after modification with 4-pentenoyl chloride and an unmodified, uncrosslinked PELLETHANE sample.

Films as prepared in Example 13 were characterized and tested by Nuclear Magnetic Resonance (NMR) spectroscopy and tensile testing, respectively. Films of unmodified samples (with inclusion of DMPA and UV exposure) were used as controls. The proton NMR spectrum showed signals between 5 and 6 ppm consistent with the splitting pattern expected from a vinyl group (absent in the control sample) (e.g., FIG. 13). Tensile tests revealed improved, recovery (at least 30%), creep (at least 25%) and improved hysteresis (at least 15%) (e.g., FIG. 14).

Example 15

Control of Modification Extent

PELLETHANE was modified similar to the methods described in Example 11, with 0.2, 0.3, 0.4, 0.6, and 0.8 grams of NaH added to five different reactions. After isolation and purification, calculations from proton-NMR spectra of the five modified samples revealed a steady increase in modification extent with increasing NaH addition:

| NaH (grams) | 0.2 | 0.3 | 0.4 | 0.6 | 0.8 |
|---|---|---|---|---|---|
| Modification (%) theoretical* | 5 | 7.5 | 10 | 15 | 20 |
| Modification (%) (actual)** | 4.7 | 6.9 | 10.1 | 14.7 | 20.0 |

*Theoretical: based on calculations assuming 1:1 eaction of NaH with carbamate hydrogen
**% modification = % of Hydrogens on carbamate substituted with modification agent

Example 16

Modification of PELLETHANE with Silanes

A polyurethane solution containing 9 grams of PELLETHANE 2363 80AE and 66 grams of tetrahydrofuran (THF) was placed in a three-necked reaction vessel supplied with septum, inert gas inlet and a heating mantle. A dripping funnel was charged with 20 grams of THF, 2 drops of dibutyltin dilaurate (DBTDL) and 5 grams of isocyanatopropyl triethoxy Silane. After initiating the bubbling of an inert gas (Argon; 1 to 2 milliliter/minute) through the polymer solution the content of the reactor was heated to 60° C. whereafter the content of the dripping funnel was slowly added to the reactor over a period of 20 minutes. The reaction was stopped after 20 hours.

Example 17

Modification of PURSIL with 4-Pentenoyl Chloride

A polyurethane solution containing 25 grams of PURSIL 35 80A and 550 grams of dimethylformamide (DMF) was placed in a three-necked reaction vessel supplied with septum, inert gas inlet and a cooling jacket. After initiating the bubbling of an inert gas (Argon; 1 to 2 milliliter/minute) through the polymer solution, the contents of the reactor were cooled down to below 0° C. A slurry, consisting out of 1.5 grams sodium hydride (or butyllithium) and 10 grams DMF was then added to the reactor over a period of 10 minutes and the resulting mixture was left for 60 minutes. Fifty percent molar excess 4-pentenoyl chloride were added drop-wise over a period of 15-20 minutes using a syringe. The reaction was stopped after 60 minutes. In addition to maintaining an inert atmosphere in the reaction vessel, its contents was shielded from light and stirred (300 rpm).

Example 18

Modified PURSIL Isolation and Purification

The reaction mixture prepared according to methods described in Example 17 was slowly (over a period of 10 minutes) poured into a container containing 1600 milliliter of vigorously stirred water (2-6° C.) to effect the precipitation of the modified polymer. After decantation of the major part of the solvent, remaining solvents were removed from the polymer by vacuum drying for 24 hours in the dark at room temperature. The dried polymer was re-dissolved in 180 grams of THF and re-precipitated in 2000 milliliter of n-Hexane (−10 to −20° C.). Subsequent removal of solvents by decantation and vacuum drying produced a yield of 12.37 grams of modified PURSIL product.

Example 19

Crosslinking of Modified PURSIL

To a 10% solution (w/w) of tetrahydrofuran and modified PURSIL (as described in Example 18) DMPA (0.5-3.0 parts per hundred resin) was added. Solid films were cast from the solution by standard solvent casting and evaporation techniques (as described in Examples 8 and 12). The dried films (0.5 mm thick) were subsequently exposed to ultraviolet irradiation (315-400 nm) for 20 minutes (see subsequent samples 8_26-8_31 below) to effect the crosslinking. The crosslinked films were vacuum dried for 18 hours at room temperature. The crosslink density was determined by measuring the swollen volume of the crosslinked polymer, using the swelling index (Q) (as described in Example 13). The weight of the dried film was measured in air and as a float in n-hexane after which the films were allowed to swell in dimethylformamide (DMF) (for at least 18 hours) and then weighed in air and as a float in n-hexane and the swelling index (Q), which is defined as the volume of solvent per volume of polymer, calculated.

TABLE 11

| | | | Swelling Results | | | |
|---|---|---|---|---|---|---|
| Exp | Modification Agent | Initiator | [Initiator] phr | Method of Initiation | Initiation Details | Swelling Index, Q |
| 8_26 | 4-PCl | DMPA | 0.5 | UV | 20 min | 8.83 |
| 8_27 | 4-PCl | DMPA | 1.0 | UV | 20 min | 8.46 |
| 8_28 | 4-PCl | DMPA | 1.5 | UV | 20 min | 7.80 |
| 8_29 | 4-PCl | DMPA | 2.0 | UV | 20 min | 7.04 |
| 8_30 | 4-PCl | DMPA | 2.5 | UV | 20 min | 5.64 |
| 8_31 | 4-PCl | DMPA | 3.0 | UV | 20 min | 6.74 |

The modified material was successfully crosslinked using UV as means of initiation and the swelling index calculated. The lowest swelling index (highest crosslinking density) was obtained (Example 8_30) when 2.5 parts per hundred resin DMPA was used to crosslink a polyurethane material (that was modified with 4-pentenoyl chloride). Control samples (unmodified) irradiated in the presence of DMPA dissolved in the solvent.

Example 20

Analyses

Figure 15:
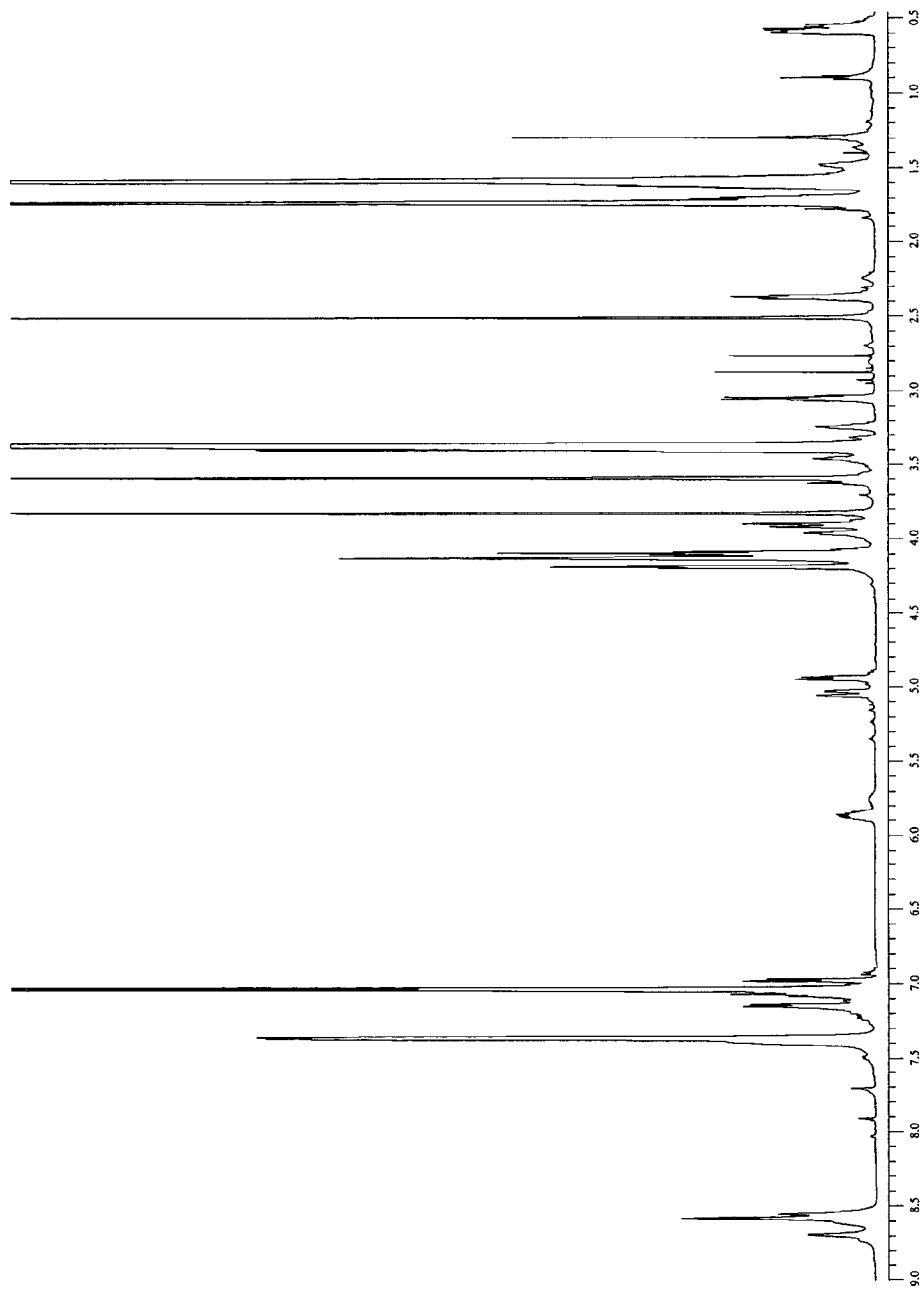
FIG. 15 is a representation of the proton NMR spectrum of the modified PURSIL with 4-pentenoyl chloride (18.5% modification).

Films as prepared in Example 19 were characterized and tested by Nuclear Magnetic Resonance (NMR) spectroscopy and tensile testing, respectively. Films of unmodified samples (with inclusion of DMPA and UV exposure) were used as controls. The proton NMR spectrum showed signals between 4.8 and 6 ppm consistent with the splitting pattern expected from a vinyl group (absent in the control sample) (e.g., FIG. 15). Tensile tests revealed improved, recovery (at least 20%), creep (at least 20%) and improved hysteresis (at least 10%).

Example 21

Control of Modification Extent

PURSIL was modified similar to the methods described in Example 17, with 0.7, 1.13 and 1.50 grams NaH added to three different reactions. After isolation and purification, calculations from proton-NMR spectra of the five modified samples revealed a steady increase in modification extent with increasing NaH addition:

| NaH (grams) | 0.75 | 1.13 | 1.50 |
|---|---|---|---|
| Modification (%) (theoretical)* | 11.5 | 15.0 | 18.5 |
| Modification (%) (actual)** | 11.7 | 15.2 | 17.9 |

*Theoretical: based on calculations assuming 1:1 reaction of NaH with carbamate hydrogen
**% modification = % of Hydrogens on carbamate substituted with modification agent The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a polymer, the method comprising:
   providing a thermoplastic polymer comprising urethane groups having backbone carbamate nitrogen atoms, and optionally urea groups having backbone urea nitrogen atoms; and
   reacting at least one backbone carbamate nitrogen atom and/or optional backbone urea nitrogen atom of the thermoplastic polymer with a modification agent to form a modified polymer; wherein the modification agent has a formula $X-R-(Y)_a$,
   wherein X is $-COR_1$, and
   wherein $R_1$ is chlorine;
   R is a bond or an organic group;
   each Y is independently a crosslinkable group; and
   a is 1 to 3;
   with the proviso that Y does not include a silane or substituted silane group.

2. The method of claim 1, wherein reacting comprises reacting no greater than 50% of the backbone carbamate nitrogen atoms and/or the optional backbone urea nitrogen atoms with the modification agent.

3. The method of claim 1, further comprising activating the modified polymer to form a crosslinked polymer.

4. The method of claim 3, wherein activating comprises heating, irradiating, moisture treating, or combinations thereof.

5. The method of claim 3, further comprising shaping the modified polymer before or during activating to form a crosslinked polymer.

6. The method of claim 3, further comprising combining the modified polymer with an initiator before activating the modified polymer.

7. The method of claim 6, wherein the initiator is a free radical initiator.

8. The method of claim 7, wherein the free radical initiator is selected from the group consisting of thermal initiators, photoinitiators, redox initiators, and combinations thereof.

9. The method of claim 3, further comprising combining the modified polymer with one or more monomers before activating the modified polymer.

10. The method of claim 9, wherein the monomers comprise mono- or poly-(meth)acrylates, acrylamides, or combinations thereof.

11. The method of claim 1, wherein the reaction of the thermoplastic polymer with the modification agent occurs in a solvent capable of at least partially dissolving or swelling the polymer.

12. The method of claim 1, wherein the thermoplastic polymer comprises:
   a soft segment derived from a polyester diol, a polycarbonate diol, a polyether diol, a polysiloxane diol, and/or a hydrocarbon diol; and
   a hard segment derived from an aliphatic and/or aromatic diisocyanate and a monomeric diol and/or diamine.

13. The method of claim 12, wherein the thermoplastic polymer comprises a medical grade polyurethane.

14. The method of claim 1, wherein each Y independently comprises a vinyl or substituted vinyl group.

15. The method of claim 14, wherein each Y is independently $-CR_2=CR_3R_4$, wherein:
   $R_2$, $R_3$, and $R_4$ are each independently selected from the group consisting of $-H$, $-CH_3$, $-(CR_6R_7)_bCH_3$, $-C_6H_5$, $-C(O)R_8$, and $-OCH_2R_9$;
   $R_6$, $R_7$, $R_8$, and $R_9$ are each independently selected from the group consisting of $-H$, a halogen, a linear or branched aliphatic group, aromatic group, and combination of a linear or branched aliphatic group and an aromatic group; and
   b is 0 to 10.

16. The method of claim 1, wherein each Y is independently $-CH=CH_2$ or $-(CH_3)C=CH_2$.

17. The method of claim 1, wherein R comprises a linear or branched hydrocarbon group, ester group, amide group, ether group, amine group, or combinations thereof.

18. The method of claim 17, wherein R is selected from the group consisting of $-CH_2-$, $-C_6H_4-$, $-(CR_{12}R_{13})_e-$, $R_{14}OC(O)(CR_{12}R_{13})_e-$, $R_{14}C(O)O(CR_{12}R_{13})_e-$, $-R_{14}C(O)N(CR_{12}R_{13})_e$, $-(CR_{12}R_{13})_e-O-(CR_{15}R_{16})_f-$, $-(CR_{12}R_{13})_e-NH-(CR_{15}R_{16})_f-$, $-(CH_2)_2-O-C(O)-$ and combinations thereof;
   wherein:
   e is 1 to 5;
   f is 1 to 5;
   $R_{12}$, $R_{13}$, $R_{15}$, and $R_{16}$ are independently $-H$, a halogen, a linear or branched saturated or unsaturated aliphatic group, an aromatic group, or a combination of the aliphatic and aromatic groups; and each $R_{14}$ is independently a linear or branched saturated or unsaturated aliphatic group or an aromatic group.

19. A method of preparing a polymer, the method comprising:

providing a thermoplastic polymer comprising urethane groups having backbone carbamate nitrogen atoms, and optionally urea groups having backbone urea nitrogen atoms; and reacting at least one backbone carbamate nitrogen atom and/or optional backbone urea nitrogen atom of the thermoplastic polymer with a modification agent to form a modified polymer; wherein the modification agent has a formula $X—R—(Y)_a$, wherein:

X comprises an electrophilic center reactive with the backbone carbamate nitrogen and/or optional urea nitrogen on the thermoplastic polymer;

R is $—(CH_2)_2—$, $—(CH_2)_3—$, or $—(CH_2)_2—O—C(O)—$;

each Y is independently a crosslinkable group; and a is 1 to 3;

with the proviso that Y does not include a silane or substituted silane group.

20. A method of preparing a polymer, the method comprising:

providing a thermoplastic polymer comprising urethane groups having backbone carbamate nitrogen atoms, and optionally urea groups having backbone urea nitrogen atoms; and reacting at least one backbone carbamate nitrogen atom and/or optional backbone urea nitrogen atom of the thermoplastic polymer with a modification agent to form a modified polymer; wherein the modification agent has a formula $X—R—(Y)_a$, wherein $X—R—(Y)_a$ comprises acryloyl chloride, methacryloyl chloride, 4-pentenoyl chloride, or isocyanatoethylacrylate.

21. A method of preparing a polymer, the method comprising:

providing a thermoplastic polymer comprising urethane groups having backbone carbamate nitrogen atoms, and optionally urea groups having backbone urea nitrogen atoms; and reacting at least one backbone carbamate nitrogen atom and/or optional backbone urea nitrogen atom of the thermoplastic polymer with a modification agent to form a modified polymer; wherein the modification agent has a formula $X—R—(Y)_a$, wherein:

X comprises an electrophilic center reactive with the backbone carbamate nitrogen and/or optional urea nitrogen on the thermoplastic polymer;

R is a bond or an organic group;

each Y is independently a crosslinkable group; and a is 1 to 3;

with the proviso that Y does not include a silane or substituted silane group; and treating the thermoplastic polymer with a basic reagent before or during the addition of the modification agent.

22. The method of claim 21, wherein the basic reagent comprises triethylamine, sodium hydride, butyllithium, 1,8-diazobicyclo[5.4.0]undec-7-ene (DBU), 1-4-diazobicyclo[2.2.2]octane (DABCO), Hünigs base, dimethylaminopyridine (DMAP), or 1,5-diazobicyclo[4.3.0]non-5-ene (DBN).

23. A polymer preparable by the method of claim 1.

24. A medical device comprising the polymer of claim 23.

25. A polymer preparable by the method of claim 19.

26. A medical device comprising the polymer of claim 25.

27. A polymer preparable by the method of claim 20.

28. A medical device comprising the polymer of claim 27.

29. A polymer preparable by the method of claim 21.

30. A medical device comprising the polymer of claim 29.

31. The method of claim 19, further comprising combining the modified polymer with one or more monomers and activating the modified polymer to form a crosslinked polymer.

32. The method of claim 31, wherein the monomers comprise mono- or poly-(meth)acrylates, acrylamides, or combinations thereof.

33. The method of claim 20, further comprising combining the modified polymer with one or more monomers and activating the modified polymer to form a crosslinked polymer.

34. The method of claim 33, wherein the monomers comprise mono- or poly-(meth)acrylates, acrylamides, or combinations thereof.

35. The method of claim 21, further comprising combining the modified polymer with one or more monomers and activating the modified polymer to form a crosslinked polymer.

36. The method of claim 35, wherein the monomers comprise mono- or poly-(meth) acrylates, acrylamides, or combinations thereof.

* * * * *